United States Patent
Lee et al.

(10) Patent No.: US 8,989,127 B2
(45) Date of Patent: Mar. 24, 2015

(54) METHOD AND DEVICE FOR RELAY NODE RETRANSMITTING BACKHAUL UPLINK TO BASE STATION IN A WIRELESS COMMUNICATION SYSTEM

(75) Inventors: Seungmin Lee, Anyang-si (KR); Hanbyul Seo, Anyang-si (KR); Kijun Kim, Anyang-si (KR); Byounghoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 94 days.

(21) Appl. No.: 13/818,296

(22) PCT Filed: Aug. 23, 2011

(86) PCT No.: PCT/KR2011/006223
§ 371 (c)(1),
(2), (4) Date: Feb. 21, 2013

(87) PCT Pub. No.: WO2012/030100
PCT Pub. Date: Mar. 8, 2012

(65) Prior Publication Data
US 2013/0148622 A1    Jun. 13, 2013

Related U.S. Application Data

(60) Provisional application No. 61/379,704, filed on Sep. 2, 2010, provisional application No. 61/379,719, filed on Sep. 2, 2010, provisional application No. 61/390,609, filed on Oct. 6, 2010.

(51) Int. Cl.
*H04W 76/00* (2009.01)
*G01R 31/08* (2006.01)
(Continued)

(52) U.S. Cl.
CPC ............. *H04W 72/04* (2013.01); *H04L 1/1887* (2013.01); *H04L 5/0055* (2013.01);
(Continued)

(58) Field of Classification Search
CPC ...................................................... H04W 72/04
USPC .......................................................... 370/329
See application file for complete search history.

(56) References Cited

U.S. PATENT DOCUMENTS 8,649,281 B2 * 2/2014 Nam et al. ..................... 370/252

OTHER PUBLICATIONS

Backhaul subframe allocation and HARQ operation, Jun. 28-Jul. 2, 2010, 3GPP TSG RAN WG1 meeting #61bis, R1-103491.*

(Continued)

*Primary Examiner* — Chi H Pham
*Assistant Examiner* — Shailendra Kumar
(74) *Attorney, Agent, or Firm* — Lee, Hong, Degerman, Kang & Waimey

(57) ABSTRACT

The present invention discloses a method for a relay node configuring a backhaul uplink hybrid automatic repeat and request (HARQ) process in a wireless communication system. More particularly, the present invention comprises the following steps: receiving from a base station a backhaul downlink subframe pattern and a HARQ process offset value; allocating a backhaul uplink subframes, based on the backhaul downlink subframe pattern excluding the subframe which is set to an access downlink subframe; applying the HARQ process offset value to the number of HARQ processes corresponding to the backhaul downlink subframe pattern; and configuring HARQ process identifiers to the allocated backhaul uplink subframes, wherein each of the configured HARQ process identifiers have a predetermined roundtrip time (RTT) value.

6 Claims, 11 Drawing Sheets

(51) Int. Cl.
*H04W 72/00* (2009.01)
*H04W 72/04* (2009.01)
*H04L 1/18* (2006.01)
*H04L 5/00* (2006.01)
*H04L 1/00* (2006.01)
*H04W 84/04* (2009.01)

(52) U.S. Cl.
CPC ........... *H04L 1/1822* (2013.01); *H04L 1/1896* (2013.01); *H04L 5/0007* (2013.01); *H04L 5/0048* (2013.01); *H04L 2001/0097* (2013.01); *H04W 72/0446* (2013.01); *H04W 84/047* (2013.01)
USPC ............ 370/329; 370/281; 370/252; 370/315

(56) References Cited

OTHER PUBLICATIONS

Report of [64b: 10] email discussion on HARQ process for TTI Bundling, Feb. 9-13, 2009, 3GPP TSG-RAN WG2 Meeting #65, R2-091390.*
Introduction of E-TFC selection for 1.28Mcps TDD, May 7-11, 2007, 3GPP TSG-RAN-WG2 Meeting#58, R2-072226.*
CATT, Backhaul subframe allocation and HARQ operation, Jun. 28-Jul. 2, 2010, 3GPP TSG RAN WG1 meeting #61bis, R1-103491.*
Sunplus mMobile Inc., Report of [64b: 10] email discussion on HARQ process for TTI Bundling, Feb. 9-13, 2009, 3GPP TSG-RAN WG2 Meeting #65, R2-091390.*
Catt, "Backhaul subframe allocation and HARQ operation", R1-103491, 3GPP TSG RAN WG1 meeting #61bis, Jun. 2010, 7 pages.
Sunplus Mmobile Inc., "Report of [64b: 10] email discussion on HARQ process for TTI Bundling", R2-091390, 3GPP TSG-RAN WG2 Meeting #65, Feb. 2009, 11 pages.
Zte, et al., "Introduction of E-TFC Selection for 1.28Mcps TDD", R2-072226, 3GPP TSG-RAN-WG2 Meeting #58, May 2007, 10 pages.
PCT International Application No. PCT/KR2011/006223, Written Opinion of the International Searching Authority dated Mar. 20, 2012, 17 pages.

* cited by examiner (a) control-plane protocol stack (b) user-plane protocol stack

METHOD AND DEVICE FOR RELAY NODE RETRANSMITTING BACKHAUL UPLINK TO BASE STATION IN A WIRELESS COMMUNICATION SYSTEM

TECHNICAL FIELD

The present invention relates to a wireless communication system, and more particularly, to a method and apparatus for performing backhaul uplink retransmission to a base station at a relay node in a wireless communication system.

BACKGROUND ART

A $3^{rd}$ Generation Partnership Project Long Term Evolution (3GPP LTE) communication system will be described as an exemplary wireless communication system to which the present invention can be applied.

FIG. 1 is a schematic view illustrating an Evolved Universal Mobile Telecommunications System (E-UMTS) network configuration as an exemplary wireless communication system. E-UMTS is an evolution of the legacy UMTS. E-UMTS is under basic standardization in the 3GPP. In general, it can be said that E-UMTS is an LTE system. For details of the UMTS and E-UMTS technical specifications, refer to Release 7 and Release 8 in "$3^{rd}$ Generation Partnership Project; Technical Specification Group Radio Access Network".

Referring to FIG. 1, the E-UMTS system includes a User Equipment (UE), evolved Node Bs (eNode Bs or eNBs), and an Access Gateway (AG) which is located at an end of the network (E-UTRAN), connected to an external network. An eNode B can simultaneously transmit multiple data streams for broadcast service, multicast service and/or unicast service.

A single eNode B manages one or more cells. A cell is set to operate in one of the bandwidths of 1.25, 2.5, 5, 10, 15 and 20 Mhz and provides downlink or uplink transmission service to a plurality of UEs. Different cells may be set to provide different bandwidths. The eNode B controls data transmission and reception to and from a plurality of UEs. Regarding DownLink (DL) data, the eNode B signals information about a time/frequency area, coding scheme, data size, Hybrid Automatic Repeat and reQuest (HARQ) information, etc. for data transmission to a UE by DL scheduling information. Regarding UpLink (UL) data, the eNode B signals information about a time/frequency area, coding scheme, data size, Hybrid Automatic Repeat and reQuest (HARQ) information, etc. available to the UE by UL scheduling information. An interface for transmitting user traffic or control traffic may be used between eNode Bs. A Core Network (CN) may be configured with an AG and a network node for performing user registration of a UE. The AG manages the mobility of UEs on a Tracking Area (TA) basis. A TA is composed of a plurality of cells.

Although wireless communication technology has reached the developmental stage of LTE based on Wideband Code Division Multiple Access (WCDMA), demands and expectations of users and service providers are ever increasing. Considering that other radio access technologies are being developed, new technological evolutions are required to achieve future competitiveness. There exists a need for reduction of cost per bit, increase of service availability, flexible use of frequency bands, simplified structures and open interfaces, and appropriate power consumption of UEs.

DISCLOSURE

Technical Problem

An object of the present invention devised to solve the conventional problem is to provide a method and apparatus for performing backhaul uplink retransmission to a base station at a relay node in a wireless communication system.

Technical Solution

In an aspect of the present invention, a method for configuring a Hybrid Automatic Repeat reQuest (HARQ) process at a relay node in a wireless communication system includes receiving a backhaul downlink subframe pattern and an HARQ process offset value from a base station, allocating backhaul uplink subframes based on the backhaul downlink subframe pattern excluding subframes set as access downlink subframes, applying the HARQ process offset value to the number of HARQ processes corresponding to the backhaul downlink subframe pattern, and configuring HARQ process IDentifiers (IDs) for the allocated backhaul uplink subframes based on the number of HARQ processes to which the HARQ process offset value is applied. Each of the configured HARQ process IDs has a predetermined Round Trip Time (RTT) value. The access downlink subframes may be subframes having indexes 0, 4, 5 and 9.

In another aspect of the present invention, a relay node in a wireless communication system includes a reception module for receiving a backhaul downlink subframe pattern and an HARQ process offset value from a base station and a processor for configuring HARQ process IDs based on the backhaul downlink subframe pattern and the HARQ process offset value. The processor is configured to allocate backhaul uplink subframes based on the backhaul downlink subframe pattern excluding subframes set as access downlink subframes, apply the HARQ process offset value to the number of HARQ processes corresponding to the backhaul downlink subframe pattern, and configure the HARQ process IDs for the allocated backhaul uplink subframes based on the number of HARQ processes to which the HARQ process offset value is applied. Each of the configured HARQ process IDs has a predetermined RTT value. The access downlink subframes may be subframes having indexes 0, 4, 5 and 9.

The HARQ process offset value may indicate an increment or a decrement of the number of HARQ processes corresponding to the backhaul downlink subframe pattern. If the backhaul downlink subframe pattern has a period of 8 ms, the number of HARQ processes to which the offset value is applied may be 6 at maximum.

If the backhaul downlink subframe pattern has a period of 8 ms, the predetermined RTT may be 20 ms.

Advantageous Effects

According to the embodiments of the present invention, a relay node can effectively perform backhaul uplink retransmission to a base station in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BEST MODE

The configuration, operation, and other features of the present invention will readily be understood with embodiments of the present invention described with reference to the attached drawings. Embodiments of the present invention as set forth herein are examples in which the technical features of the present invention are applied to a $3^{rd}$ Generation Partnership Project (3GPP) system.

While embodiments of the present invention are described in the context of Long Term Evolution (LTE) and LTE-Advanced (LTE-A) systems, this is purely exemplary. Thus, the embodiments of the present invention are applicable to any communication system falling within the definition. In addition, while the embodiments of the present invention are described in the context of Frequency Division Duplex (FDD) by way of example, the present invention can also be readily implemented in Half-FDD (H-FDD) or Time Division Duplex (TDD) with some modifications.

Figure 1:
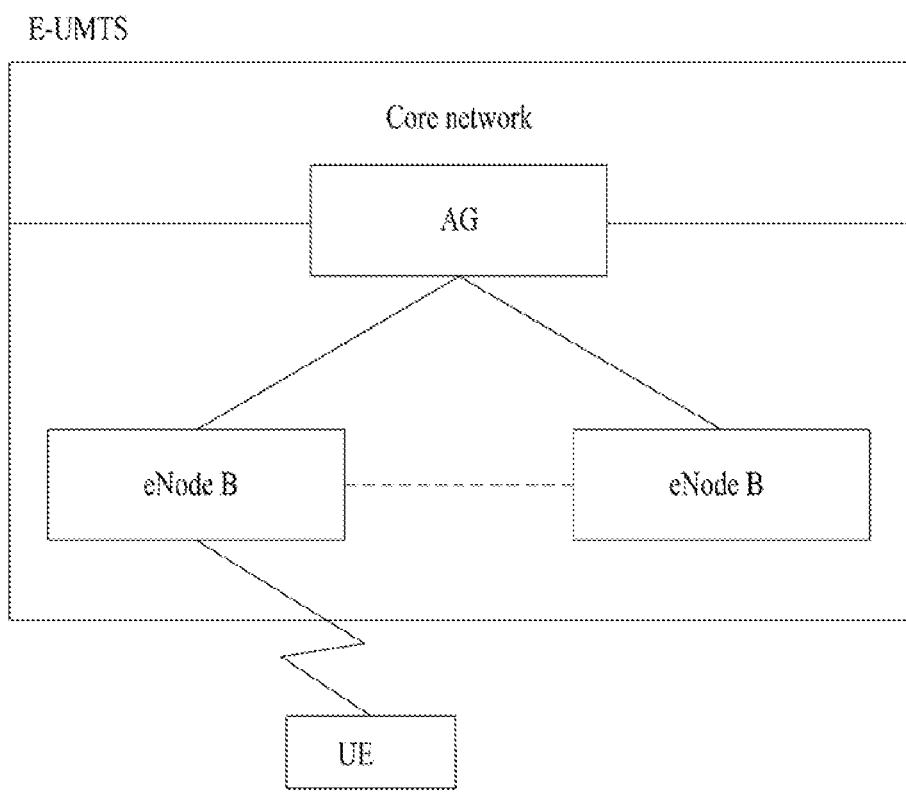
FIG. 1 is a schematic view illustrating an Evolved Universal Mobile Telecommunications System (E-UMTS) network configuration as an exemplary wireless communication system.
Figure 2:
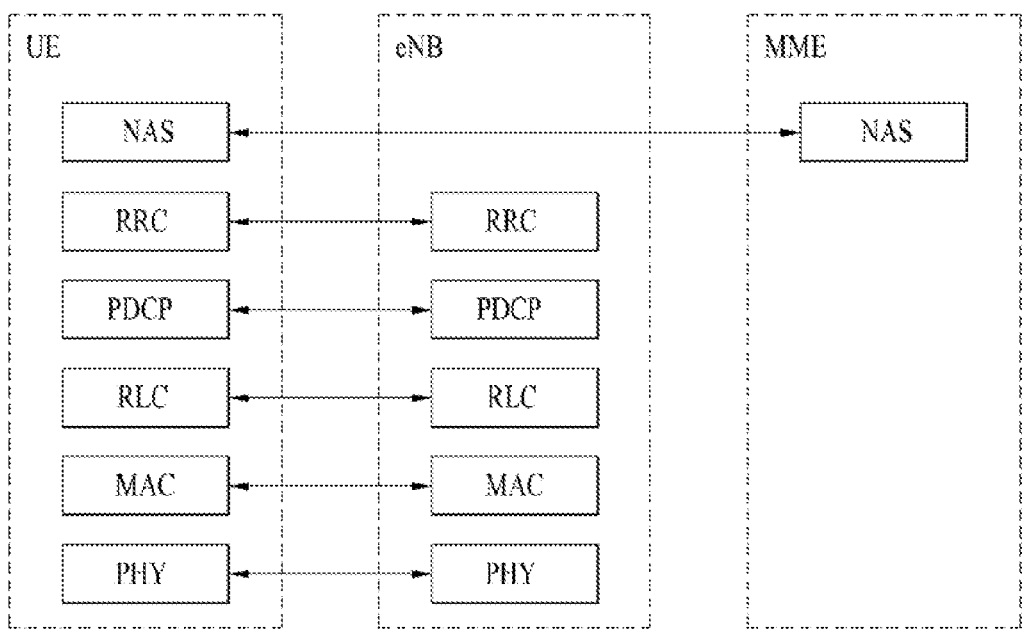
FIG. 2 illustrates a control-plane protocol stack and a user-plane protocol stack in a radio interface protocol architecture between a User Equipment (UE) and an Evolved UMTS Terrestrial Radio Access Network (E-UTRAN), conforming to a $3^{rd}$ Generation Partnership Project (3 GPP) wireless access network standard.
Figure 2:
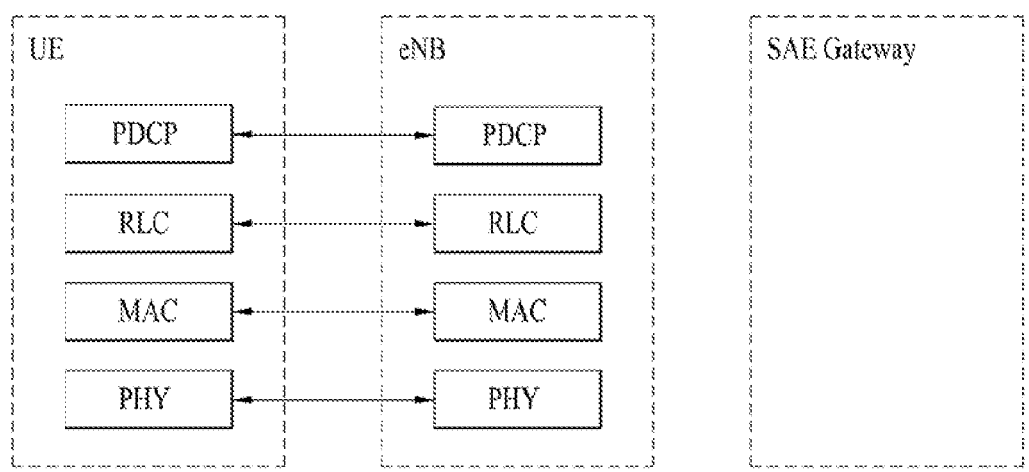

FIG. 2 illustrates a control-plane protocol stack and a user-plane protocol stack in a radio interface protocol architecture between a User Equipment (UE) and an Evolved UMTS Terrestrial Radio Access Network (E-UTRAN), conforming to a 3GPP wireless access network standard. The control plane is a path in which the UE and the E-UTRAN transmit control messages to manage calls, and the user plane is a path in which data generated from an application layer, for example, voice data or Internet packet data is transmitted.

A physical layer at Layer 1 (L1) provides information transfer service to its higher layer, Medium Access Control (MAC) layer. The physical layer is connected to the MAC layer via transport channels. The transport channels deliver data between the MAC layer and the physical layer. Data is transmitted on physical channels between the physical layers of a transmitter and a receiver. The physical channels use time and frequency as radio resources. Specifically, the physical channels are modulated in Orthogonal Frequency Division Multiple Access (OFDMA) for downlink and in Single Carrier Frequency Division Multiple Access (SC-FDMA) for uplink.

The MAC layer at Layer 2 (L2) provides service to its higher layer, Radio Link Control (RLC) layer via logical channels. The RLC layer at L2 supports reliable data transmission. The functionality of the RLC layer may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of Radio Bearers (RBs). An RB refers to a service provided at L2, for data transmission between the UE and the E-UTRAN. For this purpose, the RRC layers of the UE and the E-UTRAN exchange RRC messages with each other. If an RRC connection has been established between the RRC layers of the UE and the E-UTRAN, the UE is in RRC connected mode. Otherwise, the UE is in RRC idle mode. A Non-Access Stratum (NAS) layer above the RRC layer performs functions such as session management, mobility management, etc.

A cell covered by an evolved Node B (eNode B or eNB) is set to one of the bandwidths of 1.25, 2.5, 5, 10, 15, and 20 MHz and provides downlink or uplink transmission service to a plurality of UEs in the bandwidth. Different cells may be set to different bandwidths.

Downlink transport channels used to deliver data from the E-UTRAN to UEs include a Broadcast Channel (BCH) carrying system information, a Paging Channel (PCH) carrying a paging message, and a downlink Shared Channel (SCH) carrying user traffic or a control message. Downlink multicast or broadcast traffic or control messages may be transmitted on the downlink SCH or a separately defined downlink Multicast Channel (MCH). Uplink transport channels used to deliver data from a UE to the E-UTRAN include a Random Access Channel (RACH) carrying an initial control message and an uplink SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
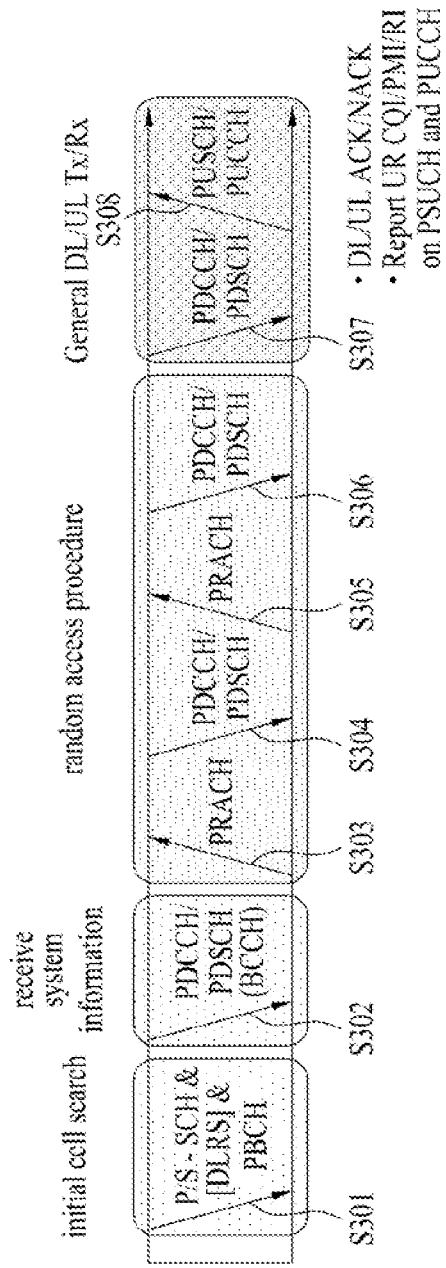
FIG. 3 illustrates physical channels and a general method for transmitting signals on the physical channels in a 3GPP system.

FIG. 3 illustrates physical channels and a general method for transmitting signals on the physical channels in a 3GPP system.

When a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a downlink channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information delivered on the PDCCH (S302).

If the UE initially accesses the eNB or has no radio resources for signal transmission to the eNB, the UE may perform a random access procedure (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based random access procedure, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general downlink and uplink signal transmission procedure. Particularly, the UE receives Downlink Control Information (DCI) on the PDCCH. The DCI includes control information such as resource allocation information for the UE. The DCI has a different format depending on its usage.

Control information that the UE transmits to the eNB on the uplink or receives from the eNB on the downlink includes a downlink/uplink ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
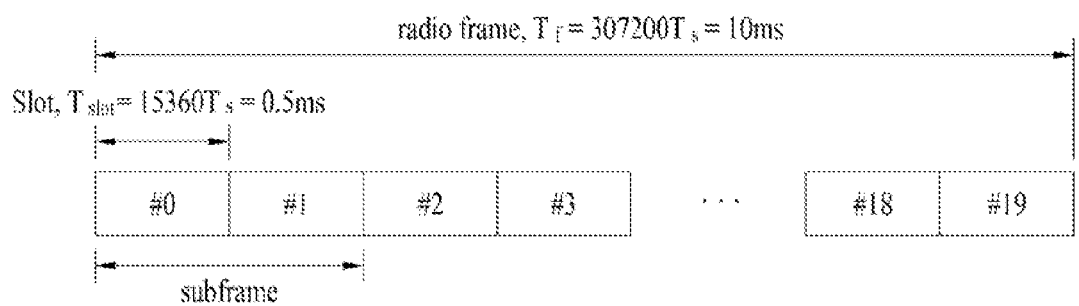
FIG. 4 illustrates an exemplary radio frame structure in a Long Term Evolution (LTE) system.

FIG. 4 illustrates a radio frame structure in the LTE system.

Referring to FIG. 4, a radio frame is 10 ms (327,200 $T_s$) in duration. The radio frame is divided into 10 equal-sized subframes, each subframe being 1ms long. Each subframe is further divided into two slots, each slot of 0.5 ms (15,360 $T_s$) duration. $T_s$ represents a sampling time and is given as $T_s=1/(15 \text{ kHz} \times 2048)=3.2552 \times 10^{-8}$ (about 33 ns). A slot is defined by a plurality of Orthogonal Frequency Division Multiplexing (OFDM) symbols in time by a plurality of Resource Blocks (RBs) in frequency. One RB has 12 subcarriers by 7 (6) OFDM symbols in the LTE system. A unit time in which data is transmitted, known as Transmission Time Interval (TTI) may be defined by one or more subframes. This radio frame structure is purely exemplary and thus the number of subframes in a radio frame, the number of slots in a subframe, or the number of OFDM symbols in a slot may vary.

Figure 5:
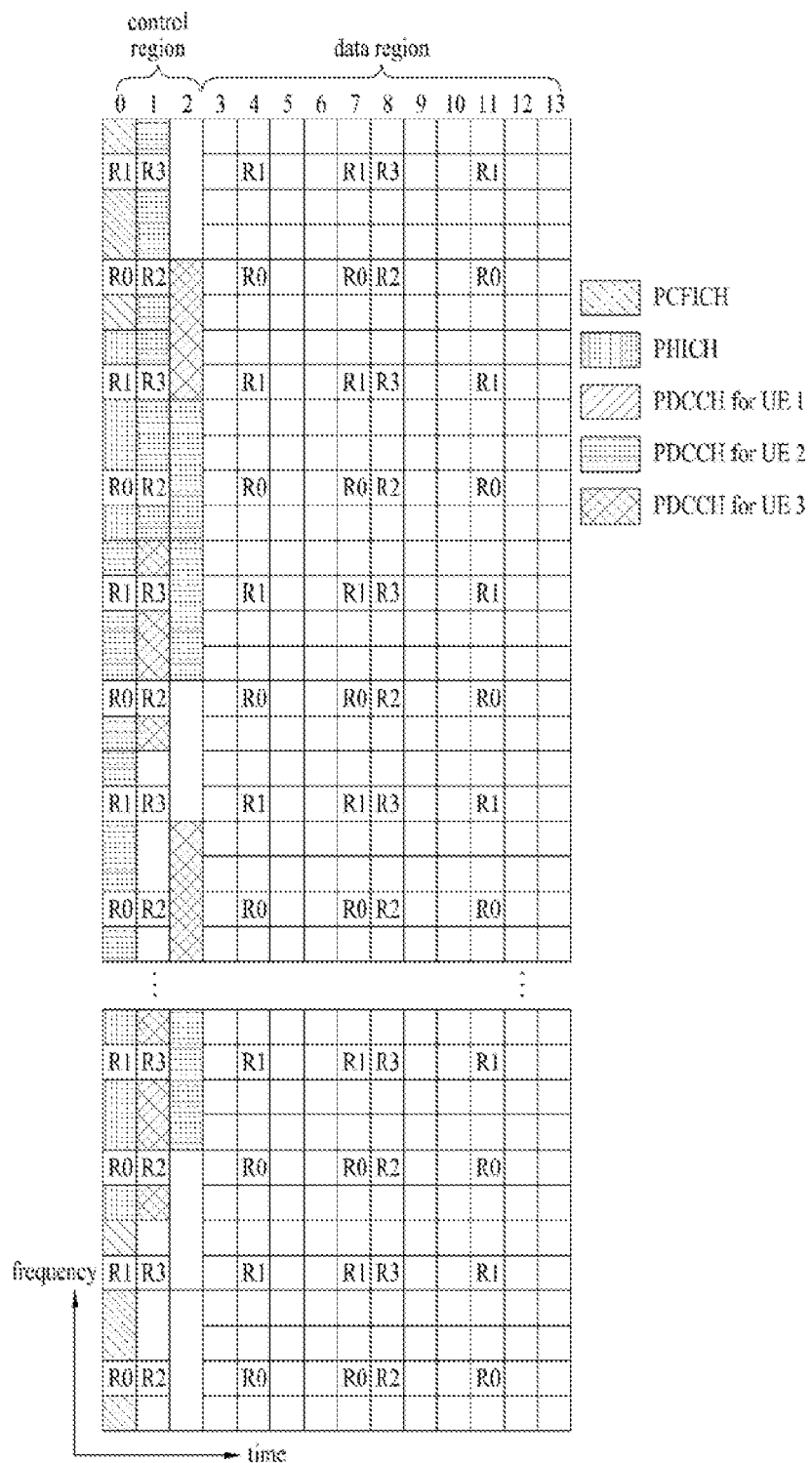
FIG. 5 illustrates an exemplary downlink subframe structure in the LTE system.

FIG. 5 illustrates exemplary control channels included in the control region of a subframe in a downlink radio frame.

Referring to FIG. 5, a subframe includes 14 OFDM symbols. A control region occupies the first one to three OFDM symbols and a data region occupies the other 13 to 11 OFDM symbols in the subframe according to the configuration of the subframe. In FIG. 5, reference characters R0 to R3 denote Reference Signals (RSs) or pilot signals for antenna 0 to antenna 3. RSs are transmitted in a predetermined pattern within a subframe irrespective of the control region and the data region of the subframe. Control channels are allocated to resources unused for RSs in the control region, and traffic channels are allocated to resources unused for RSs in the data region. The control channels of the control region are a Physical Control Format Indicator Channel (PCFICH), a Physical Hybrid-ARQ Indicator Channel (PHICH), a Physical Downlink Control Channel (PDCCH), etc.

The PCFICH indicates the number of OFDM symbols used for PDCCHs in every subframe to UEs. The PCFICH is located in the first OFDM symbol and configured with priority over the PHICH and the PDCCHs. The PCFICH includes four Resource Element Groups (REGs), each REG being distributed across the control region based on a cell Identity (ID). One REG has four REs. An RE is a minimum physical resource defined as one subcarrier by one OFDM symbol. A PCFICH value, which is modulated in Quadrature Phase Shift Keying (QPSK), ranges from 1 to 3 or from 2 to 4 according to a bandwidth.

The PHICH carries an HARQ ACK/NACK for uplink transmission. That is, the PHICH is a channel used to deliver an HARQ ACK/NACK for uplink HARQ. The PHICH includes one REG and is scrambled cell-specifically. The ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. The same PHICH (group) occurs three times, for achieving a diversity gain in the frequency and/or time domain.

A PDCCH is allocated to the first n OFDM symbols of a subframe. n is 1 or a larger integer indicated by the PCFICH. The PDCCH includes one or more Control Channel Elements (CCEs). The PDCCH is used to inform a UE or a UE group of the resource allocation of transport channels, namely a PCH and a DownLink SCH (DL-SCH), an uplink scheduling grant, and HARQ information. The PCH and the DL-SCH are transmitted on a PDSCH. Therefore, the eNB and the UE transmit and receive data on a PDSCH except for particular control information or service data.

Information about the destination (one or more UEs) of data of a PDSCH and information about how the UEs should receive and decode the PDSCH data is delivered on a PDCCH. For example, if the Cyclic Redundancy Check (CRC) of a particular PDCCH is masked by Radio Network Temporary Identity (RNTI) "A" and information about data transmitted in radio resources "B" (e.g. a frequency position) with DCI format "C" being a transport format (e.g. a Transport Block (TB) size, a modulation scheme, coding information, etc.) is transmitted in a particular subframe, UEs within the cell of the eNB monitor the PDCCH using their RNTI information. If one or more UEs have RNTI "A", the UEs receive the PDCCH and receive a PDSCH indicated by "B" and "C" based on the received information of the PDCCH.

Figure 6:
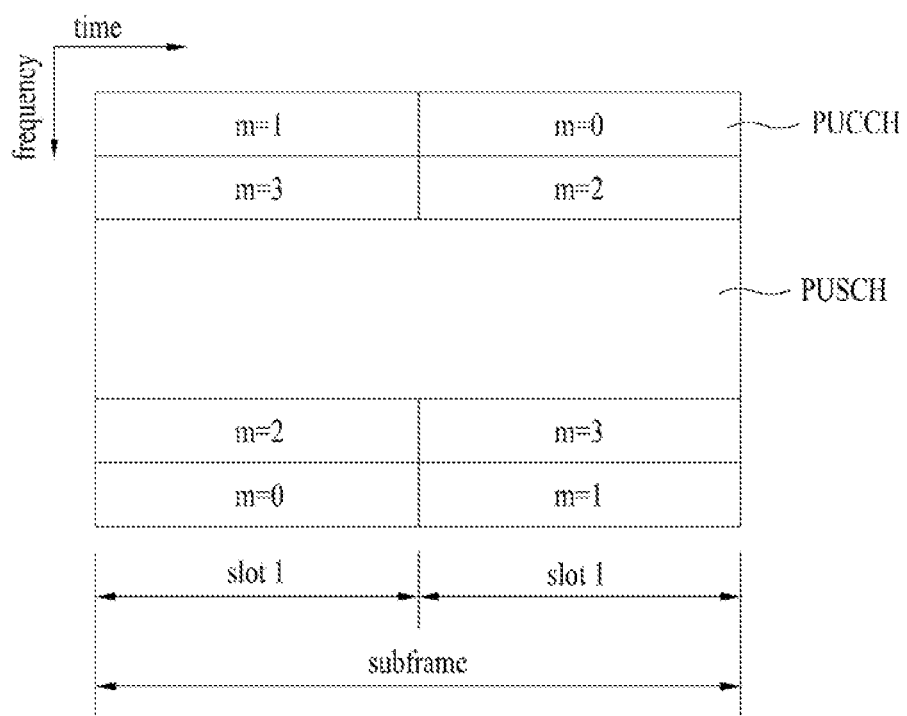
FIG. 6 illustrates an exemplary uplink subframe structure in the LTE system.

FIG. 6 illustrates an uplink subframe structure in the LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a CQI representing a downlink channel state, an RI for Multiple Input and Multiple Output (MIMO), a Scheduling Request (SR) being a request for allocation of uplink resources, etc. A PUCCH of a UE occupies RBs in different frequencies in the slots of a subframe. That is, two RBs allocated to the PUCCH frequency-hop over the slot boundary. Particularly, FIG. 6 illustrates an example in which PUCCHs for which m=0, m=1, m=2 and m=3, respectively are allocated to a subframe.

If the channel state between an eNB and a UE gets poor, a radio channel having a better channel state may be provided to the UE by installing a Relay Node (RN) between the eNB and the UE. In addition, introduction of an RN to a cell edge in a poor channel state with respect to an eNB can extend cell service coverage as well as provide a high-speed data channel. In this manner, RNs are widely used as a technology introduced to eliminate propagation shadowing areas in a wireless communication system.

Conventionally, the function of an RN was confined to the function of a repeater that simply amplifies a signal and forwards the amplified signal. However, more intelligent RNs have recently been developed. Furthermore, the RN technology is a requisite technology to reduce eNB installation cost and backhaul maintenance cost, while extending service coverage and increasing data throughput in a future-generation mobile communication system. Along with the growth of the RN technology, there exists a need to support an RN used in a conventional wireless communication system for a new wireless communication system.

Figure 7:
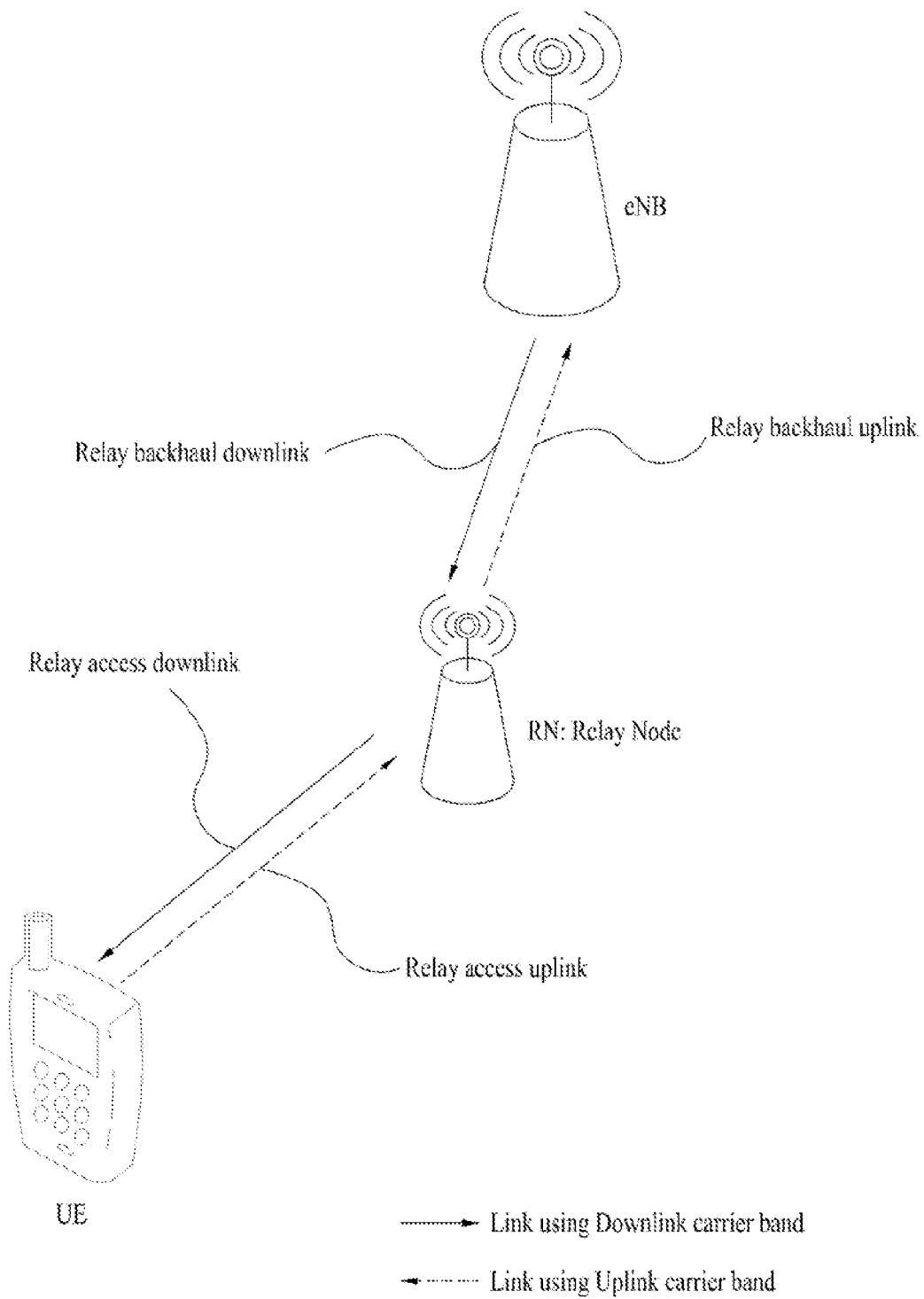
FIG. 7 illustrates the configurations of a relay backhaul link and a relay access link in a wireless communication system.

FIG. 7 illustrates the configuration of a relay backhaul link and a relay access link in a wireless communication system.

Referring to FIG. 7, in a 3GPP LTE-A system, with the introduction of an RN to forward the link between an eNB and a UE, two types of links having different attributes apply to each of DL and UL carrier frequency bands. The link between the eNB and the RN is defined as a relay backhaul link. A backhaul link through which a signal is transmitted using a downlink frequency band (in FDD) or a downlink subframe (in TDD) is called a backhaul downlink, whereas a link through which a signal is transmitted using an uplink frequency band (in FDD) or an uplink subframe (in TDD) is called a backhaul uplink.

The link between the RN and a UE is defined as a relay access link. A relay access link through which a signal is transmitted using a downlink frequency band (in FDD) or a downlink subframe (in TDD) is called an access downlink, whereas a relay access link through which a signal is transmitted using an uplink frequency band (in FDD) or an uplink subframe (in TDD) is called an access uplink.

An RN may receive information from an eNB through a relay backhaul downlink and may transmit information to the eNB through a relay backhaul uplink. In addition, the RN may transmit information to a UE through a relay access downlink and receive information from the UE through a relay access uplink.

In regard to an RN's use of a frequency band (or spectrum), its operation can be classified into in-band and out-band. For an in-band RN, a backhaul link shares the same frequency band with an access link. If the backhaul link and the access link operate in different frequency bands, the RN is an out-band RN. In both in-band and out-band relaying, a UE (legacy UE) operating in the conventional LTE system (e.g. Release-8) should be able to access a donor cell.

Depending on whether a UE is aware of the existence of an RN, RNs may be classified into a transparent RN and a non-transparent RN. If the UE does not perceive whether it communicates with a network via an RN, the RN is a transparent RN. In contrast, if the UE perceives whether it communicates with a network via an RN, the RN is a non-transparent RN.

In relation to control of RNs, RNs may be classified into an RN configured as a part of a donor cell and an RN that self-controls a cell.

The former RN may have an RN ID, although it does not have its own cell ID. If at least a part of Radio Resource Management (RRM) of an RN is controlled by an eNB covering the donor cell, the RN is regarded as configured as a part of the donor cell (even though the other parts of the RRM reside in the RN). Preferably, this RN can support legacy UEs. For instance, smart repeaters, decode-and-forward relays, various types of L2 RNs, and type-2 RNs form a part of a donor cell.

The latter RN controls one or more cells. The cells are allocated their unique physical cell IDs and they may use the same RRM mechanism. From the viewpoint of a UE, there is no distinction between accessing a cell controlled by an RN and accessing a cell controlled by a macro eNB. Preferably, a cell controlled by this type of RN may support legacy UEs. For example, RNs of this type include self-backhauling RNs, L3 RNs, type-1 RNs, and type-1a RNs.

A type-1 RN is an in-band RN that controls a plurality of cells. Each of the plurality of cells appears to a UE as a separate cell distinct from a donor cell. The plurality of cells have their own physical cell IDs (as defined in LTE Release-8) and the RN can transmit its own synchronization channels, RSs, etc. During a single-cell operation, a UE may receive scheduling information and an HARQ feedback directly from the RN and transmit its control channels (an SR, a CQI, an ACK/NACK, etc.) to the RN. The type-1 RN appears as a legacy eNB (operating in conformance to LTE Release-8) to a legacy UE (conforming to LTE Release-8). That is, the type-1 RN has backward compatibility. On the other hand, to LTE-A UEs, the type-1 RN appears different from a legacy eNB. Thus the type-1 RN can enhance performance.

Except for its out-band operation, a type-1a RN is characterized by the same set of features as the type-1 RN. The type-1a RN may be configured such that the influence of its operation on an L1 operation is minimized or eliminated.

A type-2 RN is an in-band RN that does not have its own physical cell ID and thus does not form a new cell. Since the type-2 RN is transparent to legacy UEs, the legacy UEs do not notice the existence of the type-2 RN. The type-2 RN can transmit a PDCCH but does not transmit at least a Common RS (CRS) and a PDCCH.

In order to allow in-band relaying, some resources in the time-frequency domain should be set aside for a backhaul link and these resources may be set not to be used for an access link. This is called resource partitioning.

A description will be given of the general principle of resource partitioning at an RN. A backhaul downlink and an access downlink may be Time Division Multiplexing (TDM)-multiplexed in one carrier frequency (that is, only one of the backhaul downlink and the access downlink is activated at a specific time). Similarly, a backhaul uplink and an access uplink may be TDM-multiplexed in one carrier frequency (that is, only one of the backhaul uplink and the access uplink is activated at a specific time).

Multiplexing of backhaul links in FDD is performed such that backhaul downlink transmission and backhaul uplink transmission take place in a downlink frequency band and an uplink frequency band, respectively. In comparison, multiplexing of backhaul links in TDD is performed such that backhaul downlink transmission and backhaul uplink transmission take place in a downlink subframe between an eNB and an RN and an uplink subframe between the eNB and the RN, respectively.

In the case of an in-band RN, for example, if backhaul downlink reception from an eNB and access downlink transmission to a UE are performed simultaneously in the same frequency band, a signal transmitted from the transmitter of the RN may be received at the receiver of the RN. As a result, signal interference or Radio Frequency (RF) jamming may occur at the RF front-end of the RN. Likewise, if access uplink reception from a UE and backhaul uplink transmission to an eNB take place simultaneously in the same frequency band, the RF front-end of the RN may experience signal interference. Therefore, simultaneous eNB-to-RN and RN-to-UE transmissions in the same frequency band may not be feasible unless a reception signal and a transmission signal are sufficiently isolated from each other (e.g. a transmission antenna is geographically apart enough from a reception antenna (e.g. on the ground/underground)).

One way to handle the signal interference is to operate the RN such that while the RN is receiving a signal from a donor cell, it is not transmitting signals to UEs. That is, a gap is created in the RN-to-UE transmission and UEs (including legacy UEs) are not supposed to expect any RN transmission during the gap. This gap may be created by configuring a Multicast Broadcast Single Frequency Network (MBSFN) subframe.

Figure 8:
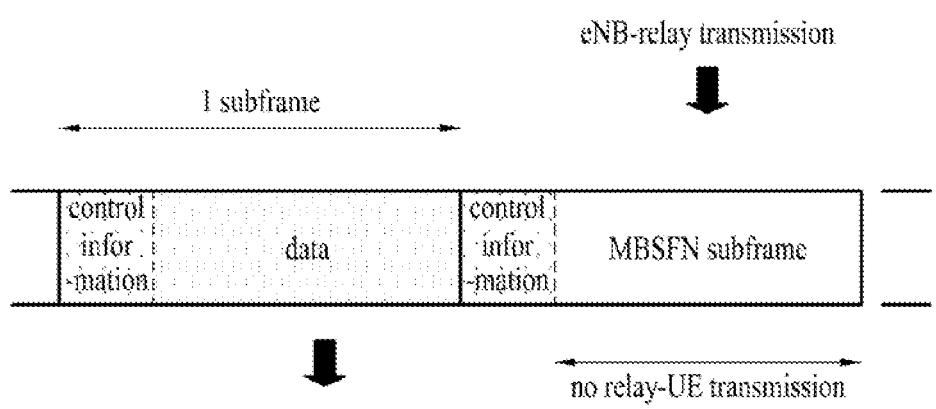
FIG. 8 illustrates exemplary partitioning of relay node resources.

FIG. 8 illustrates an example of RN resource partitioning.

In FIG. 8, a first subframe is a general subframe in which an RN transmits a downlink (i.e. an access downlink) control signal and data to a UE and a second subframe is an MBSFN subframe in which an RN transmits a control signal to a UE in the control region of a DL subframe but no transmission occurs from an RN to a UE in the other region of the DL subframe. Since a legacy UE expects PDCCH transmission in every DL subframe (in other words, an RN needs to allow legacy UEs within its area to receive a PDCCH in each subframe and thus support a measurement function), it is necessary to transmit a PDCCH in every DL subframe to ensure reliable operations of legacy UEs. Therefore, the RN needs access downlink transmission in the first N (N=1, 2 or 3) OFDM symbols of even a subframe (a second subframe 1020) configured for downlink (i.e. backhaul downlink) transmission from an eNB to the RN, instead of backhaul downlink reception. Since the RN transmits a PDCCH to UEs in the control region of the second subframe, backward compatibility may be provided to legacy UEs served by the RN. The RN may receive a signal from the eNB in the remaining region of the second subframe in which no transmission occurs from the RN to UEs. Thus, an in-band RN does not perform access downlink transmission and backhaul downlink reception simultaneously by the above-described resource partitioning.

The second subframe using an MBSFN subframe will be described in detail. The control region of the second subframe may be referred to as an RN non-hearing interval. An RN transmits an access downlink signal without receiving a backhaul downlink signal in the RN non-hearing interval. The RN non-hearing interval may have 1, 2 or 3 OFDM symbols. The RN may transmit an access downlink signal to a UE in the RN non-hearing interval and receive a backhaul downlink signal from an eNB in the other interval. Since the RN cannot perform transmission and reception simultaneously in the same frequency band, time is taken for the RN to switch from Transmission (Tx) mode to Reception (Rx) mode. Therefore, a Guard Time (GT) needs to be set in a starting part of the backhaul downlink reception area, for Tx/Rx mode switching of the RN. Similarly, when the RN receives a backhaul downlink signal from the eNB and transmits an access downlink signal to a UE, a GT may be set for Rx/Tx mode switching of the RN. The length of a GT may be a time-domain value, for example, k (k≥1) time samples ($T_s$) or one or more OFDM symbols. Or when RN backhaul downlink subframes are successively configured or according to a predetermined subframe timing alignment relationship, a GT may not be defined or set at the end of a subframe. To maintain backward compatibility, a GT may be defined only in a frequency area set for backhaul downlink subframe transmission (if a GT is set in an access downlink period, legacy UEs cannot be supported). The RN may receive a PDCCH and a PDSCH from the eNB in the backhaul downlink reception period except for the GT. The PDCCH and PDSCH may be called an R-PDCCH and an R-PDSCH to indicate that they are RN dedicated physical channels.

According to the present invention, a subframe corresponding to a backhaul link between an eNB and an RS is called a backhaul subframe or Un subframe, and a subframe corresponding to an access link between a UE and an RS is called an access subframe or Uu subframe. However, the present invention is not limited to the specific link names.

A description will be given of a method for determining the number of backhaul uplink HARQ processes in progress at an RN in an embodiment of the present invention. Features involved in determining the number of HARQ processes at an RN are applicable to a UE as well as to an RN. That is, it is clarified that with the introduction of the concept of an advanced PDCCH being an enhancement version of a PDCCH to the LTE-A system, the features involved in determining the number of HARQ processes at an RN can be applied to an HARQ process operation between an eNB and a UE. By way of example, an HARQ process operation between an eNB and an RN that is surely introduced to the LTE-A system will be described in detail.

As an approach to determination of the number of backhaul uplink HARQ processes in progress at an RN, the present invention proposes a method for sharing a configuration table listing backhaul downlink subframe patterns mapped to numbers of backhaul uplink HARQ processes between an eNB and an RN before they start communication and then signaling configuration information from the eNB to the RN by higher-layer signaling.

The number of backhaul uplink HARQ processes corresponding to each backhaul downlink subframe pattern may be set in various manners. As a major example, the number of backhaul uplink HARQ processes may be calculated in a preset rule with no regard to a backhaul uplink transmission requirement.

That is, after determining the number of backhaul uplink HARQ processes, the eNB and the RN perform the backhaul uplink HARQ processes by sequentially allocating HARQ process Identifiers (IDs) to backhaul uplink subframes set according to the preset rule. This method is characterized in that when a retransmission situation occurs after initial transmission, a Round Trip Time (RTT) taken to perform retransmission is variable.

Table 1 below is an exemplary configuration table for a backhaul downlink subframe pattern period of 8 ms, in which backhaul downlink subframe patterns are mapped to the numbers of backhaul uplink HARQ processes in the above manner, that is, in the preset rule. The proposed method is not limited to the 8-ms period and thus is also applicable to other periods (e.g. 10, 20, and 40 ms).

In Table 1, the preset rule is to set the maximum number of backhaul uplink subframes included in an 8-ms window as the number of HARQ processes, while moving the window.

TABLE 1

| Configuration | Number of HARQ process | Un SF allocation pattern | | | | | | | |
|---|---|---|---|---|---|---|---|---|---|
| 0 | 0 | 0 | 0 | 0 | 0 | 0 | 0 | 0 | 0 |
| 1 | 1 | 0 | 0 | 0 | 0 | 0 | 0 | 0 | 1 |
| 2 | 1 | 0 | 0 | 0 | 0 | 0 | 0 | 1 | 0 |
| 3 | 2 | 0 | 0 | 0 | 0 | 0 | 0 | 1 | 1 |
| 4 | 1 | 0 | 0 | 0 | 0 | 0 | 1 | 0 | 0 |
| 5 | 2 | 0 | 0 | 0 | 0 | 0 | 1 | 0 | 1 |
| 6 | 2 | 0 | 0 | 0 | 0 | 0 | 1 | 1 | 0 |

TABLE 1-continued

| Configuration | Number of HARQ process | Un SF allocation pattern | | | | | | | |
|---|---|---|---|---|---|---|---|---|---|
| 7 | 3 | 0 | 0 | 0 | 0 | 0 | 1 | 1 | 1 |
| 8 | 1 | 0 | 0 | 0 | 0 | 1 | 0 | 0 | 0 |
| 9 | 2 | 0 | 0 | 0 | 0 | 1 | 0 | 0 | 1 |
| 10 | 2 | 0 | 0 | 0 | 0 | 1 | 0 | 1 | 0 |
| 11 | 3 | 0 | 0 | 0 | 0 | 1 | 0 | 1 | 1 |
| 12 | 2 | 0 | 0 | 0 | 0 | 1 | 1 | 0 | 0 |
| 13 | 3 | 0 | 0 | 0 | 0 | 1 | 1 | 0 | 1 |
| 14 | 3 | 0 | 0 | 0 | 0 | 1 | 1 | 1 | 0 |
| 15 | 4 | 0 | 0 | 0 | 0 | 1 | 1 | 1 | 1 |
| 16 | 1 | 0 | 0 | 0 | 1 | 0 | 0 | 0 | 0 |
| 17 | 2 | 0 | 0 | 0 | 1 | 0 | 0 | 0 | 1 |
| 18 | 2 | 0 | 0 | 0 | 1 | 0 | 0 | 1 | 0 |
| 19 | 3 | 0 | 0 | 0 | 1 | 0 | 0 | 1 | 1 |
| 20 | 2 | 0 | 0 | 0 | 1 | 0 | 1 | 0 | 0 |
| 21 | 3 | 0 | 0 | 0 | 1 | 0 | 1 | 0 | 1 |
| 22 | 3 | 0 | 0 | 0 | 1 | 0 | 1 | 1 | 0 |
| 23 | 4 | 0 | 0 | 0 | 1 | 0 | 1 | 1 | 1 |
| 24 | 2 | 0 | 0 | 0 | 1 | 1 | 0 | 0 | 0 |
| 25 | 3 | 0 | 0 | 0 | 1 | 1 | 0 | 0 | 1 |
| 26 | 3 | 0 | 0 | 0 | 1 | 1 | 0 | 1 | 0 |
| 27 | 4 | 0 | 0 | 0 | 1 | 1 | 0 | 1 | 1 |
| 28 | 3 | 0 | 0 | 0 | 1 | 1 | 1 | 0 | 0 |
| 29 | 4 | 0 | 0 | 0 | 1 | 1 | 1 | 0 | 1 |
| 30 | 4 | 0 | 0 | 0 | 1 | 1 | 1 | 1 | 0 |
| 31 | 5 | 0 | 0 | 0 | 1 | 1 | 1 | 1 | 1 |
| 32 | 1 | 0 | 0 | 1 | 0 | 0 | 0 | 0 | 0 |
| 33 | 2 | 0 | 0 | 1 | 0 | 0 | 0 | 0 | 1 |
| 34 | 2 | 0 | 0 | 1 | 0 | 0 | 0 | 1 | 0 |
| 35 | 3 | 0 | 0 | 1 | 0 | 0 | 0 | 1 | 1 |
| 36 | 2 | 0 | 0 | 1 | 0 | 0 | 1 | 0 | 0 |
| 37 | 3 | 0 | 0 | 1 | 0 | 0 | 1 | 0 | 1 |
| 38 | 3 | 0 | 0 | 1 | 0 | 0 | 1 | 1 | 0 |
| 39 | 4 | 0 | 0 | 1 | 0 | 0 | 1 | 1 | 1 |
| 40 | 2 | 0 | 0 | 1 | 0 | 1 | 0 | 0 | 0 |
| 41 | 3 | 0 | 0 | 1 | 0 | 1 | 0 | 0 | 1 |
| 42 | 3 | 0 | 0 | 1 | 0 | 1 | 0 | 1 | 0 |
| 43 | 4 | 0 | 0 | 1 | 0 | 1 | 0 | 1 | 1 |
| 44 | 3 | 0 | 0 | 1 | 0 | 1 | 1 | 0 | 0 |
| 45 | 4 | 0 | 0 | 1 | 0 | 1 | 1 | 0 | 1 |
| 46 | 4 | 0 | 0 | 1 | 0 | 1 | 1 | 1 | 0 |
| 47 | 5 | 0 | 0 | 1 | 0 | 1 | 1 | 1 | 1 |
| 48 | 2 | 0 | 0 | 1 | 1 | 0 | 0 | 0 | 0 |
| 49 | 3 | 0 | 0 | 1 | 1 | 0 | 0 | 0 | 1 |
| 50 | 3 | 0 | 0 | 1 | 1 | 0 | 0 | 1 | 0 |
| 51 | 4 | 0 | 0 | 1 | 1 | 0 | 0 | 1 | 1 |
| 52 | 3 | 0 | 0 | 1 | 1 | 0 | 1 | 0 | 0 |
| 53 | 4 | 0 | 0 | 1 | 1 | 0 | 1 | 0 | 1 |
| 54 | 4 | 0 | 0 | 1 | 1 | 0 | 1 | 1 | 0 |
| 55 | 5 | 0 | 0 | 1 | 1 | 0 | 1 | 1 | 1 |
| 56 | 3 | 0 | 0 | 1 | 1 | 1 | 0 | 0 | 0 |
| 57 | 4 | 0 | 0 | 1 | 1 | 1 | 0 | 0 | 1 |
| 58 | 4 | 0 | 0 | 1 | 1 | 1 | 0 | 1 | 0 |
| 59 | 5 | 0 | 0 | 1 | 1 | 1 | 0 | 1 | 1 |
| 60 | 4 | 0 | 0 | 1 | 1 | 1 | 1 | 0 | 0 |
| 61 | 5 | 0 | 0 | 1 | 1 | 1 | 1 | 0 | 1 |
| 62 | 5 | 0 | 0 | 1 | 1 | 1 | 1 | 1 | 0 |
| 63 | 6 | 0 | 0 | 1 | 1 | 1 | 1 | 1 | 1 |
| 64 | 1 | 0 | 1 | 0 | 0 | 0 | 0 | 0 | 0 |
| 65 | 2 | 0 | 1 | 0 | 0 | 0 | 0 | 0 | 1 |
| 66 | 2 | 0 | 1 | 0 | 0 | 0 | 0 | 1 | 0 |
| 67 | 3 | 0 | 1 | 0 | 0 | 0 | 0 | 1 | 1 |
| 68 | 2 | 0 | 1 | 0 | 0 | 0 | 1 | 0 | 0 |
| 69 | 3 | 0 | 1 | 0 | 0 | 0 | 1 | 0 | 1 |
| 70 | 3 | 0 | 1 | 0 | 0 | 0 | 1 | 1 | 0 |
| 71 | 4 | 0 | 1 | 0 | 0 | 0 | 1 | 1 | 1 |
| 72 | 2 | 0 | 1 | 0 | 0 | 1 | 0 | 0 | 0 |
| 73 | 3 | 0 | 1 | 0 | 0 | 1 | 0 | 0 | 1 |
| 74 | 3 | 0 | 1 | 0 | 0 | 1 | 0 | 1 | 0 |
| 75 | 4 | 0 | 1 | 0 | 0 | 1 | 0 | 1 | 1 |
| 76 | 3 | 0 | 1 | 0 | 0 | 1 | 1 | 0 | 0 |
| 77 | 4 | 0 | 1 | 0 | 0 | 1 | 1 | 0 | 1 |
| 78 | 4 | 0 | 1 | 0 | 0 | 1 | 1 | 1 | 0 |
| 79 | 5 | 0 | 1 | 0 | 0 | 1 | 1 | 1 | 1 |
| 80 | 2 | 0 | 1 | 0 | 1 | 0 | 0 | 0 | 0 |
| 81 | 3 | 0 | 1 | 0 | 1 | 0 | 0 | 0 | 1 |
| 82 | 3 | 0 | 1 | 0 | 1 | 0 | 0 | 1 | 0 |
| 83 | 4 | 0 | 1 | 0 | 1 | 0 | 0 | 1 | 1 |
| 84 | 3 | 0 | 1 | 0 | 1 | 0 | 1 | 0 | 0 |
| 85 | 3 | 0 | 1 | 0 | 1 | 0 | 1 | 0 | 1 |
| 86 | 4 | 0 | 1 | 0 | 1 | 0 | 1 | 1 | 0 |
| 87 | 4 | 0 | 1 | 0 | 1 | 0 | 1 | 1 | 1 |
| 88 | 3 | 0 | 1 | 0 | 1 | 1 | 0 | 0 | 0 |
| 89 | 4 | 0 | 1 | 0 | 1 | 1 | 0 | 0 | 1 |
| 90 | 4 | 0 | 1 | 0 | 1 | 1 | 0 | 1 | 0 |
| 91 | 4 | 0 | 1 | 0 | 1 | 1 | 0 | 1 | 1 |
| 92 | 4 | 0 | 1 | 0 | 1 | 1 | 1 | 0 | 0 |
| 93 | 4 | 0 | 1 | 0 | 1 | 1 | 1 | 0 | 1 |
| 94 | 5 | 0 | 1 | 0 | 1 | 1 | 1 | 1 | 0 |
| 95 | 5 | 0 | 1 | 0 | 1 | 1 | 1 | 1 | 1 |
| 96 | 2 | 0 | 1 | 1 | 0 | 0 | 0 | 0 | 0 |
| 97 | 3 | 0 | 1 | 1 | 0 | 0 | 0 | 0 | 1 |
| 98 | 3 | 0 | 1 | 1 | 0 | 0 | 0 | 1 | 0 |
| 99 | 4 | 0 | 1 | 1 | 0 | 0 | 0 | 1 | 1 |
| 100 | 3 | 0 | 1 | 1 | 0 | 0 | 1 | 0 | 0 |
| 101 | 4 | 0 | 1 | 1 | 0 | 0 | 1 | 0 | 1 |
| 102 | 4 | 0 | 1 | 1 | 0 | 0 | 1 | 1 | 0 |
| 103 | 5 | 0 | 1 | 1 | 0 | 0 | 1 | 1 | 1 |
| 104 | 3 | 0 | 1 | 1 | 0 | 1 | 0 | 0 | 0 |
| 105 | 4 | 0 | 1 | 1 | 0 | 1 | 0 | 0 | 1 |
| 106 | 4 | 0 | 1 | 1 | 0 | 1 | 0 | 1 | 0 |
| 107 | 4 | 0 | 1 | 1 | 0 | 1 | 0 | 1 | 1 |
| 108 | 4 | 0 | 1 | 1 | 0 | 1 | 1 | 0 | 0 |
| 109 | 4 | 0 | 1 | 1 | 0 | 1 | 1 | 0 | 1 |
| 110 | 5 | 0 | 1 | 1 | 0 | 1 | 1 | 1 | 0 |
| 111 | 5 | 0 | 1 | 1 | 0 | 1 | 1 | 1 | 1 |
| 112 | 3 | 0 | 1 | 1 | 1 | 0 | 0 | 0 | 0 |
| 113 | 4 | 0 | 1 | 1 | 1 | 0 | 0 | 0 | 1 |
| 114 | 4 | 0 | 1 | 1 | 1 | 0 | 0 | 1 | 0 |
| 115 | 5 | 0 | 1 | 1 | 1 | 0 | 0 | 1 | 1 |
| 116 | 4 | 0 | 1 | 1 | 1 | 0 | 1 | 0 | 0 |
| 117 | 4 | 0 | 1 | 1 | 1 | 0 | 1 | 0 | 1 |
| 118 | 5 | 0 | 1 | 1 | 1 | 0 | 1 | 1 | 0 |
| 119 | 5 | 0 | 1 | 1 | 1 | 0 | 1 | 1 | 1 |
| 120 | 4 | 0 | 1 | 1 | 1 | 1 | 0 | 0 | 0 |
| 121 | 5 | 0 | 1 | 1 | 1 | 1 | 0 | 0 | 1 |
| 122 | 5 | 0 | 1 | 1 | 1 | 1 | 0 | 1 | 0 |
| 123 | 5 | 0 | 1 | 1 | 1 | 1 | 0 | 1 | 1 |
| 124 | 5 | 0 | 1 | 1 | 1 | 1 | 1 | 0 | 0 |
| 125 | 5 | 0 | 1 | 1 | 1 | 1 | 1 | 0 | 1 |
| 126 | 6 | 0 | 1 | 1 | 1 | 1 | 1 | 1 | 0 |
| 127 | 6 | 0 | 1 | 1 | 1 | 1 | 1 | 1 | 1 |
| 128 | 1 | 1 | 0 | 0 | 0 | 0 | 0 | 0 | 0 |
| 129 | 2 | 1 | 0 | 0 | 0 | 0 | 0 | 0 | 1 |
| 130 | 2 | 1 | 0 | 0 | 0 | 0 | 0 | 1 | 0 |
| 131 | 3 | 1 | 0 | 0 | 0 | 0 | 0 | 1 | 1 |
| 132 | 2 | 1 | 0 | 0 | 0 | 0 | 1 | 0 | 0 |
| 133 | 3 | 1 | 0 | 0 | 0 | 0 | 1 | 0 | 1 |
| 134 | 3 | 1 | 0 | 0 | 0 | 0 | 1 | 1 | 0 |
| 135 | 4 | 1 | 0 | 0 | 0 | 0 | 1 | 1 | 1 |
| 136 | 2 | 1 | 0 | 0 | 0 | 1 | 0 | 0 | 0 |
| 137 | 3 | 1 | 0 | 0 | 0 | 1 | 0 | 0 | 1 |
| 138 | 3 | 1 | 0 | 0 | 0 | 1 | 0 | 1 | 0 |
| 139 | 4 | 1 | 0 | 0 | 0 | 1 | 0 | 1 | 1 |
| 140 | 3 | 1 | 0 | 0 | 0 | 1 | 1 | 0 | 0 |
| 141 | 4 | 1 | 0 | 0 | 0 | 1 | 1 | 0 | 1 |
| 142 | 4 | 1 | 0 | 0 | 0 | 1 | 1 | 1 | 0 |
| 143 | 5 | 1 | 0 | 0 | 0 | 1 | 1 | 1 | 1 |
| 144 | 2 | 1 | 0 | 0 | 1 | 0 | 0 | 0 | 0 |
| 145 | 3 | 1 | 0 | 0 | 1 | 0 | 0 | 0 | 1 |
| 146 | 3 | 1 | 0 | 0 | 1 | 0 | 0 | 1 | 0 |
| 147 | 4 | 1 | 0 | 0 | 1 | 0 | 0 | 1 | 1 |
| 148 | 3 | 1 | 0 | 0 | 1 | 0 | 1 | 0 | 0 |
| 149 | 4 | 1 | 0 | 0 | 1 | 0 | 1 | 0 | 1 |
| 150 | 4 | 1 | 0 | 0 | 1 | 0 | 1 | 1 | 0 |
| 151 | 5 | 1 | 0 | 0 | 1 | 0 | 1 | 1 | 1 |
| 152 | 3 | 1 | 0 | 0 | 1 | 1 | 0 | 0 | 0 |
| 153 | 4 | 1 | 0 | 0 | 1 | 1 | 0 | 0 | 1 |
| 154 | 4 | 1 | 0 | 0 | 1 | 1 | 0 | 1 | 0 |
| 155 | 5 | 1 | 0 | 0 | 1 | 1 | 0 | 1 | 1 |
| 156 | 4 | 1 | 0 | 0 | 1 | 1 | 1 | 0 | 0 |
| 157 | 5 | 1 | 0 | 0 | 1 | 1 | 1 | 0 | 1 |
| 158 | 5 | 1 | 0 | 0 | 1 | 1 | 1 | 1 | 0 |
| 159 | 6 | 1 | 0 | 0 | 1 | 1 | 1 | 1 | 1 |
| 160 | 2 | 1 | 0 | 1 | 0 | 0 | 0 | 0 | 0 |

TABLE 1-continued

| Configuration | Number of HARQ process | Un SF allocation pattern | | | | | | | |
|---|---|---|---|---|---|---|---|---|---|
| 161 | 3 | 1 | 0 | 1 | 0 | 0 | 0 | 0 | 1 |
| 162 | 3 | 1 | 0 | 1 | 0 | 0 | 0 | 1 | 0 |
| 163 | 4 | 1 | 0 | 1 | 0 | 0 | 0 | 1 | 1 |
| 164 | 3 | 1 | 0 | 1 | 0 | 0 | 1 | 0 | 0 |
| 165 | 4 | 1 | 0 | 1 | 0 | 0 | 1 | 0 | 1 |
| 166 | 4 | 1 | 0 | 1 | 0 | 0 | 1 | 1 | 0 |
| 167 | 5 | 1 | 0 | 1 | 0 | 0 | 1 | 1 | 1 |
| 168 | 3 | 1 | 0 | 1 | 0 | 1 | 0 | 0 | 0 |
| 169 | 4 | 1 | 0 | 1 | 0 | 1 | 0 | 0 | 1 |
| 170 | 3 | 1 | 0 | 1 | 0 | 1 | 0 | 1 | 0 |
| 171 | 4 | 1 | 0 | 1 | 0 | 1 | 0 | 1 | 1 |
| 172 | 4 | 1 | 0 | 1 | 0 | 1 | 1 | 0 | 0 |
| 173 | 4 | 1 | 0 | 1 | 0 | 1 | 1 | 0 | 1 |
| 174 | 4 | 1 | 0 | 1 | 0 | 1 | 1 | 1 | 0 |
| 175 | 5 | 1 | 0 | 1 | 0 | 1 | 1 | 1 | 1 |
| 176 | 3 | 1 | 0 | 1 | 1 | 0 | 0 | 0 | 0 |
| 177 | 4 | 1 | 0 | 1 | 1 | 0 | 0 | 0 | 1 |
| 178 | 4 | 1 | 0 | 1 | 1 | 0 | 0 | 1 | 0 |
| 179 | 5 | 1 | 0 | 1 | 1 | 0 | 0 | 1 | 1 |
| 180 | 4 | 1 | 0 | 1 | 1 | 0 | 1 | 0 | 0 |
| 181 | 4 | 1 | 0 | 1 | 1 | 0 | 1 | 0 | 1 |
| 182 | 4 | 1 | 0 | 1 | 1 | 0 | 1 | 1 | 0 |
| 183 | 5 | 1 | 0 | 1 | 1 | 0 | 1 | 1 | 1 |
| 184 | 4 | 1 | 0 | 1 | 1 | 1 | 0 | 0 | 0 |
| 185 | 5 | 1 | 0 | 1 | 1 | 1 | 0 | 0 | 1 |
| 186 | 4 | 1 | 0 | 1 | 1 | 1 | 0 | 1 | 0 |
| 187 | 5 | 1 | 0 | 1 | 1 | 1 | 0 | 1 | 1 |
| 188 | 5 | 1 | 0 | 1 | 1 | 1 | 1 | 0 | 0 |
| 189 | 5 | 1 | 0 | 1 | 1 | 1 | 1 | 0 | 1 |
| 190 | 5 | 1 | 0 | 1 | 1 | 1 | 1 | 1 | 0 |
| 191 | 6 | 1 | 0 | 1 | 1 | 1 | 1 | 1 | 1 |
| 192 | 2 | 1 | 1 | 0 | 0 | 0 | 0 | 0 | 0 |
| 193 | 3 | 1 | 1 | 0 | 0 | 0 | 0 | 0 | 1 |
| 194 | 3 | 1 | 1 | 0 | 0 | 0 | 0 | 1 | 0 |
| 195 | 4 | 1 | 1 | 0 | 0 | 0 | 0 | 1 | 1 |
| 196 | 3 | 1 | 1 | 0 | 0 | 0 | 1 | 0 | 0 |
| 197 | 4 | 1 | 1 | 0 | 0 | 0 | 1 | 0 | 1 |
| 198 | 4 | 1 | 1 | 0 | 0 | 0 | 1 | 1 | 0 |
| 199 | 5 | 1 | 1 | 0 | 0 | 0 | 1 | 1 | 1 |
| 200 | 3 | 1 | 1 | 0 | 0 | 1 | 0 | 0 | 0 |
| 201 | 4 | 1 | 1 | 0 | 0 | 1 | 0 | 0 | 1 |
| 202 | 4 | 1 | 1 | 0 | 0 | 1 | 0 | 1 | 0 |
| 203 | 5 | 1 | 1 | 0 | 0 | 1 | 0 | 1 | 1 |
| 204 | 4 | 1 | 1 | 0 | 0 | 1 | 1 | 0 | 0 |
| 205 | 5 | 1 | 1 | 0 | 0 | 1 | 1 | 0 | 1 |
| 206 | 5 | 1 | 1 | 0 | 0 | 1 | 1 | 1 | 0 |
| 207 | 6 | 1 | 1 | 0 | 0 | 1 | 1 | 1 | 1 |
| 208 | 3 | 1 | 1 | 0 | 1 | 0 | 0 | 0 | 0 |
| 209 | 4 | 1 | 1 | 0 | 1 | 0 | 0 | 0 | 1 |
| 210 | 4 | 1 | 1 | 0 | 1 | 0 | 0 | 1 | 0 |
| 211 | 5 | 1 | 1 | 0 | 1 | 0 | 0 | 1 | 1 |
| 212 | 4 | 1 | 1 | 0 | 1 | 0 | 1 | 0 | 0 |
| 213 | 4 | 1 | 1 | 0 | 1 | 0 | 1 | 0 | 1 |
| 214 | 4 | 1 | 1 | 0 | 1 | 0 | 1 | 1 | 0 |
| 215 | 5 | 1 | 1 | 0 | 1 | 0 | 1 | 1 | 1 |
| 216 | 4 | 1 | 1 | 0 | 1 | 1 | 0 | 0 | 0 |
| 217 | 5 | 1 | 1 | 0 | 1 | 1 | 0 | 0 | 1 |
| 218 | 4 | 1 | 1 | 0 | 1 | 1 | 0 | 1 | 0 |
| 219 | 5 | 1 | 1 | 0 | 1 | 1 | 0 | 1 | 1 |
| 220 | 5 | 1 | 1 | 0 | 1 | 1 | 1 | 0 | 0 |
| 221 | 5 | 1 | 1 | 0 | 1 | 1 | 1 | 0 | 1 |
| 222 | 5 | 1 | 1 | 0 | 1 | 1 | 1 | 1 | 0 |
| 223 | 6 | 1 | 1 | 0 | 1 | 1 | 1 | 1 | 1 |
| 224 | 3 | 1 | 1 | 1 | 0 | 0 | 0 | 0 | 0 |
| 225 | 4 | 1 | 1 | 1 | 0 | 0 | 0 | 0 | 1 |
| 226 | 4 | 1 | 1 | 1 | 0 | 0 | 0 | 1 | 0 |
| 227 | 5 | 1 | 1 | 1 | 0 | 0 | 0 | 1 | 1 |
| 228 | 4 | 1 | 1 | 1 | 0 | 0 | 1 | 0 | 0 |
| 229 | 5 | 1 | 1 | 1 | 0 | 0 | 1 | 0 | 1 |
| 230 | 5 | 1 | 1 | 1 | 0 | 0 | 1 | 1 | 0 |
| 231 | 6 | 1 | 1 | 1 | 0 | 0 | 1 | 1 | 1 |
| 232 | 4 | 1 | 1 | 1 | 0 | 1 | 0 | 0 | 0 |
| 233 | 5 | 1 | 1 | 1 | 0 | 1 | 0 | 0 | 1 |
| 234 | 4 | 1 | 1 | 1 | 0 | 1 | 0 | 1 | 0 |
| 235 | 5 | 1 | 1 | 1 | 0 | 1 | 0 | 1 | 1 |
| 236 | 5 | 1 | 1 | 1 | 0 | 1 | 1 | 0 | 0 |
| 237 | 5 | 1 | 1 | 1 | 0 | 1 | 1 | 0 | 1 |
| 238 | 5 | 1 | 1 | 1 | 0 | 1 | 1 | 1 | 0 |
| 239 | 6 | 1 | 1 | 1 | 0 | 1 | 1 | 1 | 1 |
| 240 | 4 | 1 | 1 | 1 | 1 | 0 | 0 | 0 | 0 |
| 241 | 5 | 1 | 1 | 1 | 1 | 0 | 0 | 0 | 1 |
| 242 | 5 | 1 | 1 | 1 | 1 | 0 | 0 | 1 | 0 |
| 243 | 6 | 1 | 1 | 1 | 1 | 0 | 0 | 1 | 1 |
| 244 | 5 | 1 | 1 | 1 | 1 | 0 | 1 | 0 | 0 |
| 245 | 5 | 1 | 1 | 1 | 1 | 0 | 1 | 0 | 1 |
| 246 | 5 | 1 | 1 | 1 | 1 | 0 | 1 | 1 | 0 |
| 247 | 6 | 1 | 1 | 1 | 1 | 0 | 1 | 1 | 1 |
| 248 | 5 | 1 | 1 | 1 | 1 | 1 | 0 | 0 | 0 |
| 249 | 6 | 1 | 1 | 1 | 1 | 1 | 0 | 0 | 1 |
| 250 | 5 | 1 | 1 | 1 | 1 | 1 | 0 | 1 | 0 |
| 251 | 6 | 1 | 1 | 1 | 1 | 1 | 0 | 1 | 1 |
| 252 | 6 | 1 | 1 | 1 | 1 | 1 | 1 | 0 | 0 |
| 253 | 6 | 1 | 1 | 1 | 1 | 1 | 1 | 0 | 1 |
| 254 | 6 | 1 | 1 | 1 | 1 | 1 | 1 | 1 | 0 |
| 255 | 6 | 1 | 1 | 1 | 1 | 1 | 1 | 1 | 1 |

Referring to Table 1, the number of HARQ processes at the RN is determined according to subframes configured for transmission between the eNB and the RN. In regard to FDD frame structure type 1, for example, the number of HARQ processes may be determined by a decimal number corresponding to a binary number representing an 8-bit bitmap of a parameter SubframeConfigurationFDD. This Table 1 may be shared in advance between the eNB and the RN. An HARQ process configuration based on Table 1 will be described with reference to FIG. 9.

Figure 9:
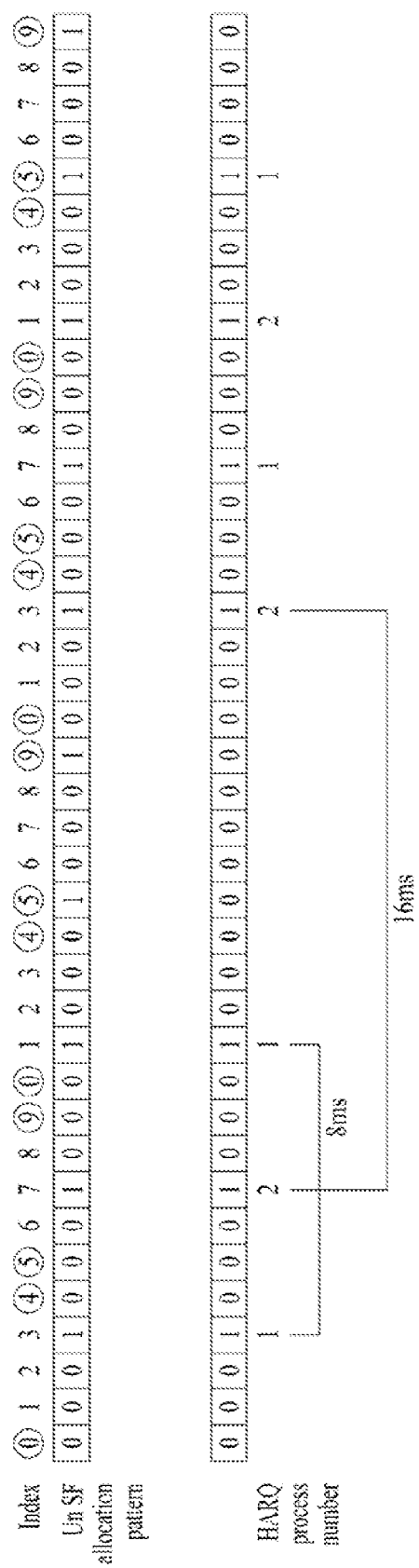
FIG. 9 illustrates a general Hybrid Automatic Repeat reQuest (HARQ) process between an evolved Node B (eNode B) and a relay node.

FIG. 9 illustrates an exemplary general HARQ process configuration between an eNB and an RN. Particularly, FIG. 9 illustrates a case where the eNB signals configuration index 17 to the RN.

Referring to FIG. 9 and Table 1, the backhaul downlink subframe allocation pattern is "00010001" and the number of HARQ processes is 2. The backhaul downlink subframe allocation pattern means that 8-bit information is repeated within a range of 40 ms. Therefore, "Un SF allocation pattern" is composed of repetitions of "00010001".

Since access downlink subframes with indexes 0, 4, 5 and 9 are not available as backhaul downlink subframes, the subframe pattern is configured with the other subframes. One thing to note herein is that backhaul uplink subframes are configured by delaying the backhaul downlink subframe pattern by a predetermined time (e.g. 4 subframes) in an FDD system.

Finally, HARQ process IDs are sequentially allocated in the subframe allocation pattern excluding the access downlink subframes.

As a consequence, HARQ process 1 is allocated to subframe 3, subframe 1, and subframe 7 in this order and thus the RTT alternates between 8 ms and 16 ms.

HARQ process 2 is allocated to subframe 7, subframe 3, and subframe 2 in this order and thus the RTT alternates between 16 ms and 8 ms.

Despite the benefit of maintaining the number of backhaul uplink HARQ processes to be a minimum value for each configuration, Table 1 has limitations in efficiently redistributing uplink resources because it does not reflect Semi-Persistent Scheduling (SPS) between an eNB and a UE and a change in the uplink transmission requirement of an RN.

To overcome the problem, the present invention proposes that the number of backhaul uplink HARQ processes having a specific RTT is increased by increasing the minimum number of backhaul uplink HARQ processes for a specific configuration in a configuration table set according to the aforedescribed preset rule.

If the number of backhaul uplink HARQ processes having a specific RTT is increased according to the present invention, although an average RTT is increased, the eNB can efficiently redistribute uplink resources according to the SPS of the UE and a change in the uplink transmission requirement of the RN.

However, even though the number of backhaul uplink HARQ processes is increased according to the present invention, if a backhaul downlink subframe allocation period is 8 ms, the maximum number of backhaul uplink HARQ processes is preferably limited to 6, which should not be construed as limiting the present invention. The maximum number of backhaul uplink HARQ processes may vary according to a change in the backhaul downlink subframe allocation period.

Table 2 and Table 3 below list configuration information including backhaul uplink HARQ processes having an RTT of 20 ms, when the numbers of backhaul uplink HARQ processes are increased by 1 in Table 1. Particularly, Table 3 illustrates an RTT pattern for each backhaul uplink HARQ process, in the case where the numbers of backhaul uplink HARQ processes are increased by 1 according to the backhaul uplink subframe pattern information illustrated in Table 2.

TABLE 2

| Configuration | Number of HARQ process | Un SF allocation pattern | | | | | | | |
|---|---|---|---|---|---|---|---|---|---|
| 17 | 3 | 0 | 0 | 0 | 1 | 0 | 0 | 0 | 1 |
| 34 | 3 | 0 | 0 | 1 | 0 | 0 | 0 | 1 | 0 |
| 68 | 3 | 0 | 1 | 0 | 0 | 0 | 1 | 0 | 0 |
| 136 | 3 | 1 | 0 | 0 | 0 | 1 | 0 | 0 | 0 |

TABLE 3

| Configuration | Number of HARQ process | RTT pattern for each HARQ process | | | | | | | | | |
|---|---|---|---|---|---|---|---|---|---|---|---|
| 17 | 3 | 20 | 20 | 20 | 20 | 20 | 20 | 20 | 20 | 20 | 20 |
|  |  | 20 | 20 | 20 | 20 | 20 | 20 | 20 | 20 | 20 | 20 |
|  |  | 20 | 20 | 20 | 20 | 20 | 20 | 20 | 20 |  |  |
| 34 | 3 | 20 | 20 | 20 | 20 | 20 | 20 | 20 | 20 | 20 | 20 |
|  |  | 20 | 20 | 20 | 20 | 20 | 20 | 20 | 20 | 20 | 20 |
|  |  | 20 | 20 | 20 | 20 | 20 | 20 | 20 | 20 |  |  |
| 68 | 3 | 20 | 20 | 20 | 20 | 20 | 20 | 20 | 20 | 20 | 20 |
|  |  | 20 | 20 | 20 | 20 | 20 | 20 | 20 | 20 | 20 | 20 |
|  |  | 20 | 20 | 20 | 20 | 20 | 20 | 20 | 20 |  |  |
| 136 | 3 | 20 | 20 | 20 | 20 | 20 | 20 | 20 | 20 | 20 | 20 |
|  |  | 20 | 20 | 20 | 20 | 20 | 20 | 20 | 20 | 20 | 20 |
|  |  | 20 | 20 | 20 | 20 | 20 | 20 | 20 | 20 |  |  |

An HARQ process configuration based on Table 2 and Table 3 will be described with reference to FIG. 10.

Figure 10:
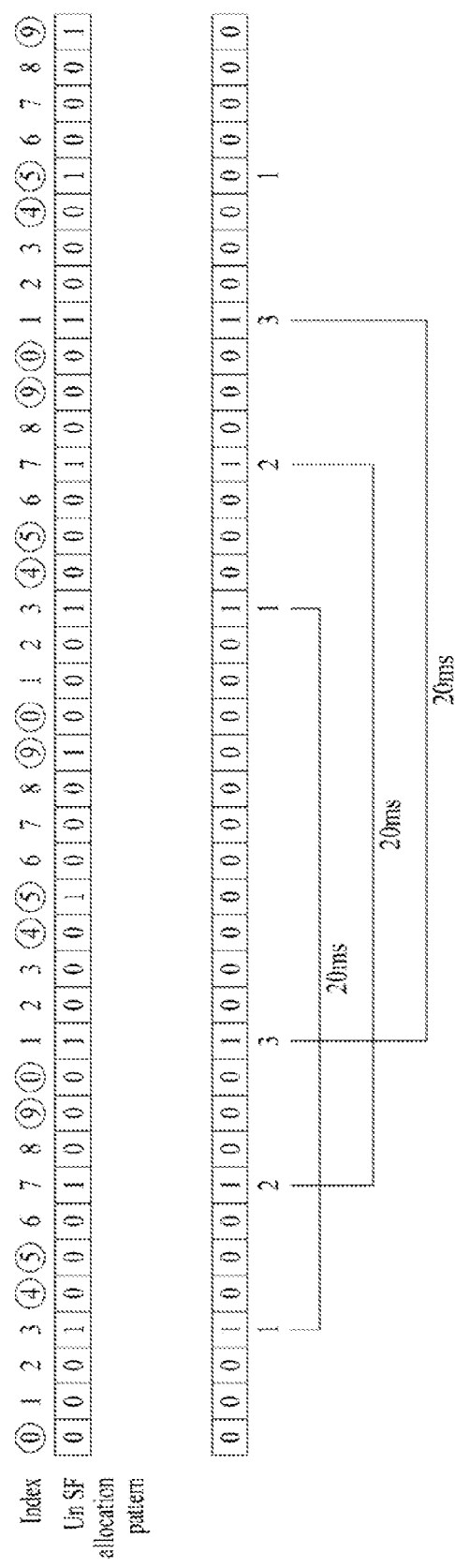
FIG. 10 illustrates an exemplary HARQ process between an eNode B and a relay node according to an embodiment of the present invention.

FIG. 10 illustrates an HARQ process configuration between an eNB and an RN according to an embodiment of the present invention. Particularly, FIG. 10 illustrates a case where the eNB signals configuration index 17 to the RN.

Referring to FIG. 9 and Table 1, the backhaul downlink subframe allocation pattern is "00010001" and the number of HARQ processes is 3. The backhaul downlink subframe allocation pattern means that 8-bit information is repeated. Therefore, "Un SF allocation pattern" is composed of repetitions of "00010001", as illustrated in FIG. 10.

As described before, since the access downlink subframes with indexes 0, 4, 5 and 9 are not available as backhaul downlink subframes, the subframe pattern is configured with the other subframes. One thing to note herein is that backhaul uplink subframes are configured by delaying the backhaul downlink subframe pattern by a predetermined time (e.g. 4 subframes) in an FDD system.

Finally, HARQ process IDs are sequentially allocated to the configured backhaul uplink subframes.

As a consequence, HARQ process 1 is allocated to subframe 3 on a 2-subframe basis and thus the RTT is 20 ms.

In addition, HARQ process 2 is allocated to subframe 7 on a 2-subframe basis and HARQ process 3 is allocated to subframe 1 on a 2-subframe basis. Thus the RTT is 20 ms for HARQ process 2 and HARQ process 3.

Table 4 and Table 5 below list configuration information including backhaul uplink HARQ processes having an RTT of 20 ms, when the numbers of backhaul uplink HARQ processes are increased by 2 in Table 1. Particularly, Table 5 illustrates an RTT pattern for each backhaul uplink HARQ process, in the case where the numbers of backhaul uplink HARQ processes are increased by 2 according to the backhaul uplink subframe pattern information illustrated in Table 4.

TABLE 4

| Configuration | Number of HARQ process | Un SF allocation pattern | | | | | | | |
|---|---|---|---|---|---|---|---|---|---|
| 23 | 6 | 0 | 0 | 0 | 1 | 0 | 1 | 1 | 1 |
| 27 | 6 | 0 | 0 | 0 | 1 | 1 | 0 | 1 | 1 |
| 29 | 6 | 0 | 0 | 0 | 1 | 1 | 1 | 0 | 1 |
| 39 | 6 | 0 | 0 | 1 | 0 | 0 | 1 | 1 | 1 |
| 43 | 6 | 0 | 0 | 1 | 0 | 1 | 0 | 1 | 1 |
| 46 | 6 | 0 | 0 | 1 | 0 | 1 | 1 | 1 | 0 |
| 51 | 6 | 0 | 0 | 1 | 1 | 0 | 0 | 1 | 1 |
| 53 | 6 | 0 | 0 | 1 | 1 | 0 | 1 | 0 | 1 |
| 54 | 6 | 0 | 0 | 1 | 1 | 0 | 1 | 1 | 0 |
| 57 | 6 | 0 | 0 | 1 | 1 | 1 | 0 | 0 | 1 |
| 58 | 6 | 0 | 0 | 1 | 1 | 1 | 0 | 1 | 0 |
| 71 | 6 | 0 | 1 | 0 | 0 | 0 | 1 | 1 | 1 |
| 77 | 6 | 0 | 1 | 0 | 0 | 1 | 1 | 0 | 1 |
| 78 | 6 | 0 | 1 | 0 | 0 | 1 | 1 | 1 | 0 |
| 83 | 6 | 0 | 1 | 0 | 1 | 0 | 0 | 1 | 1 |
| 86 | 6 | 0 | 1 | 0 | 1 | 0 | 1 | 1 | 0 |
| 89 | 6 | 0 | 1 | 0 | 1 | 1 | 0 | 0 | 1 |
| 92 | 6 | 0 | 1 | 0 | 1 | 1 | 1 | 0 | 0 |
| 99 | 6 | 0 | 1 | 1 | 0 | 0 | 0 | 1 | 1 |
| 101 | 6 | 0 | 1 | 1 | 0 | 0 | 1 | 0 | 1 |
| 102 | 6 | 0 | 1 | 1 | 0 | 0 | 1 | 1 | 0 |
| 106 | 6 | 0 | 1 | 1 | 0 | 1 | 0 | 1 | 0 |
| 108 | 6 | 0 | 1 | 1 | 0 | 1 | 1 | 0 | 0 |
| 113 | 6 | 0 | 1 | 1 | 1 | 0 | 0 | 0 | 1 |
| 114 | 6 | 0 | 1 | 1 | 1 | 0 | 0 | 1 | 0 |
| 116 | 6 | 0 | 1 | 1 | 1 | 0 | 1 | 0 | 0 |
| 139 | 6 | 1 | 0 | 0 | 0 | 1 | 0 | 1 | 1 |
| 141 | 6 | 1 | 0 | 0 | 0 | 1 | 1 | 0 | 1 |
| 142 | 6 | 1 | 0 | 0 | 0 | 1 | 1 | 1 | 0 |
| 147 | 6 | 1 | 0 | 0 | 1 | 0 | 0 | 1 | 1 |
| 149 | 6 | 1 | 0 | 0 | 1 | 0 | 1 | 0 | 1 |
| 153 | 6 | 1 | 0 | 0 | 1 | 1 | 0 | 0 | 1 |
| 154 | 6 | 1 | 0 | 0 | 1 | 1 | 0 | 1 | 0 |
| 156 | 6 | 1 | 0 | 0 | 1 | 1 | 1 | 0 | 0 |
| 163 | 6 | 1 | 0 | 1 | 0 | 0 | 0 | 1 | 1 |
| 166 | 6 | 1 | 0 | 1 | 0 | 0 | 1 | 1 | 0 |
| 169 | 6 | 1 | 0 | 1 | 0 | 1 | 0 | 0 | 1 |
| 172 | 6 | 1 | 0 | 1 | 0 | 1 | 1 | 0 | 0 |
| 177 | 6 | 1 | 0 | 1 | 1 | 0 | 0 | 0 | 1 |
| 178 | 6 | 1 | 0 | 1 | 1 | 0 | 0 | 1 | 0 |
| 184 | 6 | 1 | 0 | 1 | 1 | 1 | 0 | 0 | 0 |
| 197 | 6 | 1 | 1 | 0 | 0 | 0 | 1 | 0 | 1 |
| 198 | 6 | 1 | 1 | 0 | 0 | 0 | 1 | 1 | 0 |
| 201 | 6 | 1 | 1 | 0 | 0 | 1 | 0 | 0 | 1 |
| 202 | 6 | 1 | 1 | 0 | 0 | 1 | 0 | 1 | 0 |
| 204 | 6 | 1 | 1 | 0 | 0 | 1 | 1 | 0 | 0 |
| 209 | 6 | 1 | 1 | 0 | 1 | 0 | 0 | 0 | 1 |
| 212 | 6 | 1 | 1 | 0 | 1 | 0 | 1 | 0 | 0 |

TABLE 4-continued

| Configuration | Number of HARQ process | Un SF allocation pattern | | | | | | | |
|---|---|---|---|---|---|---|---|---|---|
| 216 | 6 | 1 | 1 | 0 | 1 | 1 | 0 | 0 | 0 |
| 226 | 6 | 1 | 1 | 1 | 0 | 0 | 0 | 1 | 0 |
| 228 | 6 | 1 | 1 | 1 | 0 | 0 | 1 | 0 | 0 |
| 232 | 6 | 1 | 1 | 1 | 0 | 1 | 0 | 0 | 0 |

TABLE 5

| Configuration | Number of HARQ process | RTT pattern for each HARQ process |
|---|---|---|
| 23 | 6 | 19 21 19 21 19 21 19 21 19 21<br>17 23 17 23 17 23 17 23 17 23<br>20 20 20 20 20 20 20 20 20 20<br>20 20 20 20 20 20 20 20 20<br>24 16 24 16 24 16 24 16 24<br>17 23 17 23 17 23 17 23 17 |
| 27 | 6 | 20 20 20 20 20 20 20 20 20<br>21 19 21 19 21 19 21 19 21 19<br>21 19 21 19 21 19 21 19 21 19<br>20 20 20 20 20 20 20 20<br>24 16 24 16 24 16 24 16 24<br>16 24 16 24 16 24 16 24 16 |
| 29 | 6 | 20 20 20 20 20 20 20 20 20 20<br>20 20 20 20 20 20 20 20 20 20<br>17 23 17 23 17 23 17 23 17<br>19 21 19 21 19 21 19 21 19<br>23 17 23 17 23 17 23 17 23<br>16 24 16 24 16 24 16 24 16 |
| 39 | 6 | 20 20 20 20 20 20 20 20 20 20<br>17 23 17 23 17 23 17 23 17 23<br>19 21 19 21 19 21 19 21 19 21<br>18 22 18 22 18 22 18 22 18<br>19 21 19 21 19 21 19 21 19<br>17 23 17 23 17 23 17 23 17 |
| 43 | 6 | 21 19 21 19 21 19 21 19 21 19<br>20 20 20 20 20 20 20 20 20<br>21 19 21 19 21 19 21 19 21 19<br>19 21 19 21 19 21 19 21 19<br>18 22 18 22 18 22 18 22 18<br>16 24 16 24 16 24 16 24 16 |
| 46 | 6 | 20 20 20 20 20 20 20 20 20 20<br>20 20 20 20 20 20 20 20 20 20<br>16 24 16 24 16 24 16 24 16<br>23 17 23 17 23 17 23 17 23<br>19 21 19 21 19 21 19 21 19<br>17 23 17 23 17 23 17 23 17 |
| 51 | 6 | 20 20 20 20 20 20 20 20 20<br>20 20 20 20 20 20 20 20 20<br>20 20 20 20 20 20 20 20<br>20 20 20 20 20 20 20 20<br>20 20 20 20 20 20 20<br>20 20 20 20 20 20 20 |
| 53 | 6 | 19 21 19 21 19 21 19 21 19 21<br>20 20 20 20 20 20 20 20 20 20<br>19 21 19 21 19 21 19 21 19 21<br>16 24 16 24 16 24 16 24 16<br>18 22 18 22 18 22 18 22 18<br>19 21 19 21 19 21 19 21 19 |
| 54 | 6 | 19 21 19 21 19 21 19 21 19 21<br>19 21 19 21 19 21 19 21 19 21<br>20 20 20 20 20 20 20 20 20<br>16 24 16 24 16 24 16 24 16<br>24 16 24 16 24 16 24 16 24<br>20 20 20 20 20 20 20 20 |
| 57 | 6 | 21 19 21 19 21 19 21 19 21 19<br>23 17 23 17 23 17 23 17 23 17<br>20 20 20 20 20 20 20 20 20<br>17 23 17 23 17 23 17 23 17<br>19 21 19 21 19 21 19 21 19<br>18 22 18 22 18 22 18 22 18 |
| 58 | 6 | 20 20 20 20 20 20 20 20<br>23 17 23 17 23 17 23 17 23 17<br>21 19 21 19 21 19 21 19 21 19<br>17 23 17 23 17 23 17 23 17 |
| 71 | 6 | 24 16 24 16 24 16 24 16 24<br>20 20 20 20 20 20 20 20<br>21 19 21 19 21 19 21 19 21 19<br>17 23 17 23 17 23 17 23 17 23<br>24 16 24 16 24 16 24 16 24 16<br>20 20 20 20 20 20 20 20 |
| 77 | 6 | 20 20 20 20 20 20 20 20<br>17 23 17 23 17 23 17 23 17<br>22 18 22 18 22 18 22 18 22 18<br>21 19 21 19 21 19 21 19 21 19<br>19 21 19 21 19 21 19 21 19<br>20 20 20 20 20 20 20 20 |
| 78 | 6 | 19 21 19 21 19 21 19 21 19<br>16 24 16 24 16 24 16 24 16<br>21 19 21 19 21 19 21 19 21 19<br>22 18 22 18 22 18 22 18 22 18<br>21 19 21 19 21 19 21 19 21<br>23 17 23 17 23 17 23 17 23 17 |
| 83 | 6 | 20 20 20 20 20 20 20 20<br>17 23 17 23 17 23 17 23 17<br>21 19 21 19 21 19 21 19 21 19<br>20 20 20 20 20 20 20 20 20<br>21 19 21 19 21 19 21 19 21 19<br>24 16 24 16 24 16 24 16 24 16 |
| 86 | 6 | 22 18 22 18 22 18 22 18 22<br>21 19 21 19 21 19 21 19 21<br>20 20 20 20 20 20 20 20 20<br>19 21 19 21 19 21 19 21 19 21<br>21 19 21 19 21 19 21 19 21 19<br>22 18 22 18 22 18 22 18 22 |
| 89 | 6 | 24 16 24 16 24 16 24 16 24<br>21 19 21 19 21 19 21 19 21<br>22 18 22 18 22 18 22 18 22 18<br>24 16 24 16 24 16 24 16 24 16<br>21 19 21 19 21 19 21 19 21 19<br>20 20 20 20 20 20 20 20 |
| 92 | 6 | 21 19 21 19 21 19 21 19 21<br>19 21 19 21 19 21 19 21 19<br>20 20 20 20 20 20 20 20 20<br>24 16 24 16 24 16 24 16 24 16<br>17 23 17 23 17 23 17 23 17<br>21 19 21 19 21 19 21 19 21 |
| 99 | 6 | 23 17 23 17 23 17 23 17 23<br>20 20 20 20 20 20 20 20<br>21 19 21 19 21 19 21 19 21 19<br>21 19 21 19 21 19 21 19 21 19<br>20 20 20 20 20 20 20 20<br>24 16 24 16 24 16 24 16 24 16 |
| 101 | 6 | 16 24 16 24 16 24 16 24 16<br>20 20 20 20 20 20 20 20<br>20 20 20 20 20 20 20 20<br>21 19 21 19 21 19 21 19 21 19<br>19 21 19 21 19 21 19 21 19 21<br>18 22 18 22 18 22 18 22 18 |
| 102 | 6 | 16 24 16 24 16 24 16 24 16<br>19 21 19 21 19 21 19 21 19<br>20 20 20 20 20 20 20 20 20<br>20 20 20 20 20 20 20 20 20<br>20 20 20 20 20 20 20 20<br>20 20 20 20 20 20 20 20 |
| 106 | 6 | 20 20 20 20 20 20 20 20<br>21 19 21 19 21 19 21 19 21 19<br>24 16 24 16 24 16 24 16 24 16<br>22 18 22 18 22 18 22 18 22 18<br>21 19 21 19 21 19 21 19 21<br>19 21 19 21 19 21 19 21 19 |
| 108 | 6 | 20 20 20 20 20 20 20 20<br>20 20 20 20 20 20 20 20 20<br>24 16 24 16 24 16 24 16 24 16<br>16 24 16 24 16 24 16 24 16<br>20 20 20 20 20 20 20 20<br>19 21 19 21 19 21 16 21 19 |
| 113 | 6 | 19 21 19 21 19 21 19 21 19<br>17 23 17 23 17 23 17 23 17 23<br>21 19 21 19 21 19 21 19 21 19<br>23 17 23 17 23 17 23 17 23 17 |

TABLE 5-continued

| Configuration | Number of HARQ process | RTT pattern for each HARQ process |
|---|---|---|
| 114 | 6 | 20 20 20 20 20 20 20 20 20 20<br>20 20 20 20 20 20 20 20 20<br>16 24 16 24 16 24 16 24 16<br>17 23 17 23 17 23 17 23 17 23 |
|  |  | 20 20 20 20 20 20 20 20 20 20<br>23 17 23 17 23 17 23 17 23 17<br>21 19 21 19 21 19 21 19 21 19 |
| 116 | 6 | 22 18 22 18 22 18 22 18 22<br>21 19 21 19 21 19 21 19 21<br>17 23 17 23 17 23 17 23 17 23<br>19 21 19 21 19 21 19 21 19 21<br>23 17 23 17 23 17 23 17 23 17 |
| 139 | 6 | 16 24 16 24 16 24 16 24 16<br>20 20 20 20 20 20 20 20<br>20 20 20 20 20 20 20 20<br>17 23 17 23 17 23 17 23 17 23<br>21 19 21 19 21 19 21 19 21 19<br>23 17 23 17 23 17 23 17 |
| 141 | 6 | 20 20 20 20 20 20 20 20<br>20 20 20 20 20 20 20 20<br>16 24 16 24 16 24 16 24 16<br>16 24 16 24 16 24 16 24 16 24<br>20 20 20 20 20 20 20 20<br>19 21 19 21 19 21 19 21 19<br>19 21 19 21 19 21 19 21 19 |
| 142 | 6 | 20 20 20 20 20 20 20 20<br>15 24 16 24 16 24 16 24 16<br>15 24 16 24 16 24 16 24 16 24<br>20 20 20 20 20 20 20 20<br>20 20 20 20 20 20 20 20<br>23 17 23 17 23 17 23 17<br>21 19 21 19 21 19 21 19 |
| 147 | 6 | 17 23 17 23 17 23 17 23 17<br>19 21 19 21 19 21 19 21 19 21<br>17 23 17 23 17 23 17 23 17 23<br>20 20 20 20 20 20 20 20 20<br>23 17 23 17 23 17 23 17 23<br>21 19 21 19 21 19 21 19 21 |
| 149 | 6 | 22 18 22 18 22 18 22 18 22<br>18 22 18 22 18 22 18 22 18 22<br>15 24 16 24 16 24 16 24 16 24<br>19 21 19 21 19 21 19 21 19<br>20 20 20 20 20 20 20 20<br>19 21 19 21 19 21 19 21 19<br>21 19 21 19 21 19 21 19 21 |
| 153 | 6 | 20 20 20 20 20 20 20 20 20<br>20 20 20 20 20 20 20 20 20<br>20 20 20 20 20 20 20 20<br>20 20 20 20 20 20 20 20<br>20 20 20 20 20 20 20 20<br>20 20 20 20 20 20 20 20 |
| 154 | 6 | 19 21 19 21 19 21 19 21 19 21<br>21 19 21 19 21 19 21 19 21 19<br>20 20 20 20 20 20 20 20<br>21 19 21 19 21 19 21 19 21<br>24 16 24 16 24 16 24 16<br>22 18 22 18 22 18 22 18 |
| 156 | 6 | 18 22 18 22 18 22 18 22 18 22<br>19 21 19 21 19 21 19 21 19<br>17 23 17 23 17 23 17 23 17<br>20 20 20 20 20 20 20 20<br>23 17 23 17 23 17 23 17 23<br>21 19 21 19 21 19 21 19 21 |
| 163 | 6 | 20 20 20 20 20 20 20 20 20<br>17 23 17 23 17 23 17 23 17 23<br>19 21 19 21 19 21 19 21 19 21<br>23 17 23 17 23 17 23 17 23<br>16 24 16 24 16 24 16 24 16<br>20 20 20 20 20 20 20 20 |
| 166 | 6 | 19 21 19 21 19 21 19 21 19 21<br>16 24 16 24 16 24 16 24 16 24<br>18 22 18 22 18 22 18 22 18<br>19 21 19 21 19 21 19 21 19<br>21 19 21 19 21 19 21 19 21<br>20 20 20 20 20 20 20 20 |
| 169 | 6 | 21 19 21 19 21 19 21 19 21 19<br>19 21 19 21 19 21 19 21 19 21 |
| 172 | 6 | 20 20 20 20 20 20 20 20 20<br>19 21 19 21 19 21 19 21 19<br>16 24 16 24 16 24 16 24 16<br>18 22 18 22 18 22 18 22 18<br>19 21 19 21 19 21 19 21 19 21<br>18 22 18 22 18 22 18 22 18<br>16 24 16 24 16 24 16 24 16<br>19 21 19 21 19 21 19 21 19 |
| 177 | 6 | 20 20 20 20 20 20 20 20 20<br>19 21 19 21 19 21 19 21 19<br>16 24 16 24 16 24 16 24 16 24<br>20 20 20 20 20 20 20 20 20<br>19 21 19 21 19 21 19 21 19 21<br>19 21 19 21 19 21 19 21 19 |
| 178 | 6 | 20 20 20 20 20 20 20 20 20<br>16 24 15 24 16 24 16 24 16<br>16 24 16 24 16 24 16 24 16 24<br>19 21 19 21 19 21 19 21 19 21<br>20 20 20 20 20 20 20 20 20<br>19 21 19 21 19 21 19 21 19<br>21 19 21 19 21 19 21 19 21 |
| 184 | 6 | 22 18 22 18 22 18 22 18 22<br>16 24 16 24 16 24 16 24 16 24<br>23 17 23 17 23 17 23 17 23 17<br>19 21 19 21 19 21 19 21 19<br>17 23 17 23 17 23 17 23 17<br>20 20 20 20 20 20 20 20 |
| 197 | 6 | 20 20 20 20 20 20 20 20<br>20 20 20 20 20 20 20 20 20<br>16 24 16 24 16 24 16 24 16 24<br>23 17 23 17 23 17 23 17 23<br>19 21 19 21 19 21 19 21 19<br>17 23 17 23 17 23 17 23 17 |
| 198 | 6 | 20 20 20 20 20 20 20 20<br>20 20 20 20 20 20 20 20 20<br>16 24 16 24 16 24 16 24 16 24<br>24 16 24 16 24 16 24 16 24<br>20 20 20 20 20 20 20 20<br>21 19 21 19 21 19 21 19 21 |
| 201 | 6 | 22 18 22 18 22 18 22 18 22 18<br>21 19 21 19 21 19 21 19 21 19<br>23 17 23 17 23 17 23 17 23<br>20 20 20 20 20 20 20 20<br>17 23 17 23 17 23 17 23 17<br>19 21 19 21 19 21 19 21 19 |
| 202 | 6 | 21 19 21 19 21 19 21 19 21 19<br>22 18 22 18 22 18 22 18 22 18<br>24 16 24 15 24 16 24 16 24<br>21 19 21 19 21 19 21 19 21<br>20 20 20 20 20 20 20 20 |
| 204 | 6 | 21 19 21 19 21 19 21 19 21<br>20 20 20 20 20 20 20 20 20<br>20 20 20 20 20 20 20 20<br>20 20 20 20 20 20 20 20<br>20 20 20 20 20 20 20 20<br>20 20 20 20 20 20 20 20 |
| 209 | 6 | 16 24 16 24 16 24 16 24 16 24<br>20 20 20 20 20 20 20 20<br>20 20 20 20 20 20 20 20<br>23 17 23 17 23 17 23 17 23<br>21 19 21 19 21 19 21 19 21<br>17 23 17 23 17 23 17 23 17 |
| 212 | 6 | 16 24 16 24 16 24 16 24 16 24<br>18 22 18 22 18 22 18 22 18 22<br>19 21 19 21 19 21 19 21 19<br>21 19 21 19 21 19 21 19 21<br>20 20 20 20 20 20 20 20<br>21 19 21 19 21 19 21 19 21 |
| 216 | 6 | 16 24 16 24 16 24 16 24 16 24<br>24 16 24 16 24 16 24 16 24 16<br>20 20 20 20 20 20 20 20<br>21 19 21 19 21 19 21 19 21<br>21 19 21 19 21 19 21 19 21<br>20 20 20 20 20 20 20 20 |

TABLE 5-continued

| Config-uration | Number of HARQ process | RTT pattern for each HARQ process | | | | | | | | | |
|---|---|---|---|---|---|---|---|---|---|---|---|
| 226 | 6 | 17 | 23 | 17 | 23 | 17 | 23 | 17 | 23 | 17 | 23 |
| | | 20 | 20 | 20 | 20 | 20 | 20 | 20 | 20 | 20 | 20 |
| | | 20 | 20 | 20 | 20 | 20 | 20 | 20 | 20 | 20 | 20 |
| | | 24 | 16 | 24 | 16 | 24 | 16 | 24 | 16 | 24 | |
| | | 17 | 23 | 17 | 23 | 17 | 23 | 17 | 23 | 17 | |
| | | 21 | 19 | 21 | 19 | 21 | 19 | 21 | 19 | 21 | |
| 228 | 6 | 17 | 23 | 17 | 23 | 17 | 23 | 17 | 23 | 17 | 23 |
| | | 19 | 21 | 19 | 21 | 19 | 21 | 19 | 21 | 19 | 21 |
| | | 18 | 22 | 18 | 22 | 18 | 22 | 18 | 22 | 18 | |
| | | 19 | 21 | 19 | 21 | 19 | 21 | 19 | 21 | 19 | |
| | | 17 | 23 | 17 | 23 | 17 | 23 | 17 | 23 | 17 | |
| | | 20 | 20 | 20 | 20 | 20 | 20 | 20 | 20 | | |
| 232 | 6 | 17 | 23 | 17 | 23 | 17 | 23 | 17 | 23 | 17 | 23 |
| | | 24 | 16 | 24 | 16 | 24 | 16 | 24 | 16 | 24 | 16 |
| | | 20 | 20 | 20 | 20 | 20 | 20 | 20 | 20 | | |
| | | 20 | 20 | 20 | 20 | 20 | 20 | 20 | 20 | | |
| | | 17 | 23 | 17 | 23 | 17 | 23 | 17 | 23 | 17 | |
| | | 19 | 21 | 19 | 21 | 19 | 21 | 19 | 21 | 19 | |

Table 6 and Table 7 below list configuration information including backhaul uplink HARQ processes having an RTT of 20 ms, when the numbers of backhaul uplink HARQ processes are increased by 3 in Table 1. Particularly, Table 7 illustrates an RTT pattern for each backhaul uplink HARQ process, in the case where the numbers of backhaul uplink HARQ processes are increased by 3 according to the backhaul uplink subframe pattern information illustrated in Table 6.

TABLE 6

| Configuration | Number of HARQ process | Un SF allocation pattern | | | | | | | |
|---|---|---|---|---|---|---|---|---|---|
| 85 | 6 | 0 | 1 | 0 | 1 | 0 | 1 | 0 | 1 |
| 170 | 6 | 1 | 0 | 1 | 0 | 1 | 0 | 1 | 0 |

TABLE 7

| Config-uration | Number of HARQ process | RTT pattern for each HARQ process | | | | | | | | | |
|---|---|---|---|---|---|---|---|---|---|---|---|
| 85 | 6 | 20 | 20 | 20 | 20 | 20 | 20 | 20 | 20 | 20 | 20 |
| | | 20 | 20 | 20 | 20 | 20 | 20 | 20 | 20 | 20 | 20 |
| | | 20 | 20 | 20 | 20 | 20 | 20 | 20 | 20 | 20 | |
| | | 20 | 20 | 20 | 20 | 20 | 20 | 20 | 20 | | |
| | | 20 | 20 | 20 | 20 | 20 | 20 | 20 | 20 | | |
| | | 20 | 20 | 20 | 20 | 20 | 20 | 20 | 20 | | |
| 170 | 6 | 20 | 20 | 20 | 20 | 20 | 20 | 20 | 20 | 20 | 20 |
| | | 20 | 20 | 20 | 20 | 20 | 20 | 20 | 20 | 20 | 20 |
| | | 20 | 20 | 20 | 20 | 20 | 20 | 20 | 20 | | |
| | | 20 | 20 | 20 | 20 | 20 | 20 | 20 | 20 | | |
| | | 20 | 20 | 20 | 20 | 20 | 20 | 20 | 20 | | |
| | | 20 | 20 | 20 | 20 | 20 | 20 | 20 | 20 | | |

More specifically, the present invention provides a method for using the proposed Table 2, Table 4 and Table 6 in combination in addition to the conventional Table 1.

For example, a total of eight combination tables including use of Table 1 only may be created from Table 1, Table 2, Table 4 and Table 6. One of the combination tables may be shared between the eNB and the UE by higher-layer signaling. More information than in the case of using only Table 1 may be required to signal configuration information and thus additional bit information is needed. Or if configuration information of Table 2, Table 4 and Table 6 is replaced with corresponding configuration information of Table 1, additional bit information may not be needed for signaling.

In another embodiment of the present invention, on the assumption that the eNB pre-stores Table 2, Table 4 and Table 6 instead of sharing the combination table with the RN, if the eNB signals configuration information, that is, index information based on Table 1 to the RN, it may allocate additional bit information to bit information used to represent the index information (e.g. 8-bit information), or may define separate signaling and signal an increment in the number of backhaul uplink HARQ processes to the RN.

For example, in the case where the eNB allocates additional 2-bit information, it may signal four increments +1, +2, +3 and +4 regarding the number of backhaul uplink HARQ processes. That is, the additional bit information means an offset value to the backhaul uplink HARQ processes illustrated in Table 1.

The offset value is not limited to a positive integer. Rather, the offset value may be 0 or a negative integer. For example, one of the offset values "−1, 0, +1, +2" or "−2, −1, 0, +1" may be indicated by further using the additional 2-bit information. Meanwhile, if the additional bit information is 1 bit, one of the offset values "0, +1" may be indicated. One of "−1, 0", "−2, 0", "0, +2" or "+1, +2" may also be represented by use of the additional 1-bit information.

The offset value may be interpreted differently according to the number of backhaul uplink HARQ processes in Table 1. For example, in the case where the additional bit information is 2 bits, indicating one of "−1, 0, +1, +2", if the number of backhaul uplink HARQ processes is 1 or 2 in Table 1, the offset value is interpreted as indicating one of 1 to 4 backhaul uplink HARQ processes. If the number of backhaul uplink HARQ processes is 3 or 4 in Table 1, the offset value is interpreted as indicating one of 2 to 5 backhaul uplink HARQ processes. If the number of backhaul uplink HARQ processes is 5 or 6 in Table 1, the offset value is interpreted as indicating one of 3 to 6 backhaul uplink HARQ processes.

In another example, in the case where the additional bit information is 2 bits, indicating one of "−1, 0, +1, +2", if the number of backhaul uplink HARQ processes is 1 or 2 in Table 1, the offset value is interpreted as indicating one of 1 to 4 backhaul uplink HARQ processes. If the number of backhaul uplink HARQ processes is 3 in Table 1, the offset value is interpreted as indicating one of 2 to 5 backhaul uplink HARQ processes. If the number of backhaul uplink HARQ processes is 4, 5 or 6 in Table 1, the offset value is interpreted as indicating one of 3 to 6 backhaul uplink HARQ processes.

Obviously, the above examples may apply to the case of additional 1-bit information as well as the case of additional 2-bit information. Notably, the numbers of backhaul uplink HARQ processes represented by offset values need to be preset or shared by separate signaling between the eNB and the RN.

According to the above examples, upon receipt of an offset value and a configuration information index illustrated in Table 1, the RN performs and maintains a backhaul uplink HARQ operation by applying the offset value to the number of backhaul uplink HARQ processes corresponding to the configuration information index in Table 1.

Figure 11:
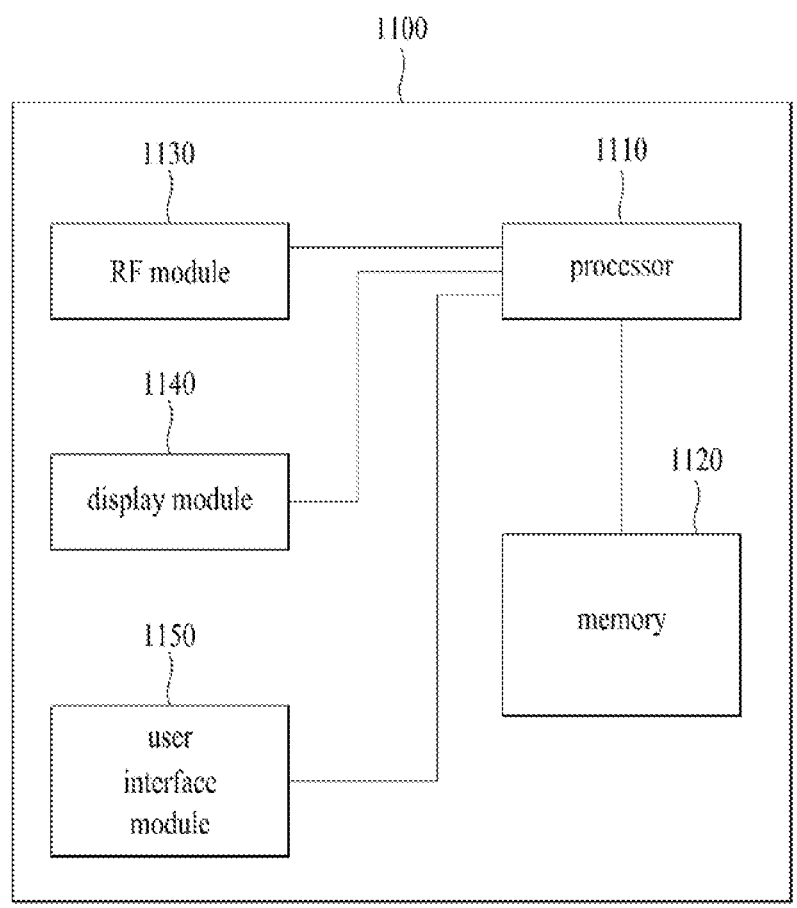
FIG. 11 is an exemplary block diagram of a communication apparatus according to an embodiment of the present invention.

FIG. 11 is a block diagram of a communication apparatus according to an embodiment of the present invention.

Referring to FIG. 11, a communication apparatus 1100 includes a processor 1110, a memory 1120, an RF module 1130, a display module 1140, and a user interface module 1150.

For the convenience' sake of description, the communication apparatus 1100 is shown as having the configuration illustrated in FIG. 11. Some modules may be removed from or added to the communication apparatus 1100. A module of the communication apparatus 1100 may be divided into more modules. The processor 1110 is configured to perform operations according to the embodiments of the present invention described before with reference to the attached drawings. Specifically, the description of FIGS. 1 to 10 may be referred to for details of the operations of the processor 1110.

The memory 1120 is connected to the processor 1110 and stores an Operating System (OS), applications, program code, data, etc. The RF module 1130 is connected to the processor 1110 and upconverts a baseband signal to an RF signal or downconverts an RF signal to a baseband signal. For this operation, the RF module 1130 performs analog conversion, amplification, filtering, and frequency upconversion or performs these processes reversely. The display module 1140 is connected to the processor 1110 and displays various types of information. The display module 1140 may be configured with, but not limited to, known components such as a Liquid Crystal Display (LCD), a Light Emitting Diode (LED), and an Organic Light Emitting Diode (OLED). The user interface module 1150 is connected to the processor 1110 and may be configured with known user interfaces in combination, such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made, centering on a data transmission and reception relationship among an RN and a BS. In some cases, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term, fixed station, Node B, 'eNode B (eNB), access point, etc.

The embodiments of the present invention may be achieved by various means, for example, hardware, firmware, software, or a combination thereof. In a hardware configuration, an embodiment of the present invention may be achieved by one or more Application Specific Integrated Circuits (ASICs), Digital Signal Processors (DSPs), Digital Signal Processing Devices (DSDPs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory and executed by a processor. The memory is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the method and apparatus for performing backhaul uplink retransmission to a BS at an RN in a wireless communication system have been described above in the context of the wireless communication system being a 3GPP LTE system, the present invention is also applicable to various wireless communication systems other than the 3GPP LTE system.

The invention claimed is:

1. A method for configured an uplink Hybrid Automatic Repeat reQuest (HARQ) process using a frequency division duplex (FDD) frame structure at a relay node in a wireless communication system, the method comprising:
   receiving information on a downlink subframe pattern from a base station,
   wherein the downlink subframe pattern is defined as a bitmap having a size of 8 bits;
   allocating downlink subframes between a base station and the relay node based on the downlink subframe pattern;
   allocating uplink subframes between the base station and the relay node based on the allocated downlink subframes; and
   assigning at least one uplink HARQ process to the allocated uplink subframes,
   wherein a number of the at least one uplink HARQ process is determined by using a decimal equivalent of the bitmap.

2. The method according to claim 1, wherein allocating downlink subframes comprises allocating the downlink subframes between the base station and the relay node based on the downlink subframe pattern except for subframes having indexes 0, 4, 5 and 9.

3. A relay node in a wireless communication system, comprising:
   a receiver configured to receive information on a downlink subframe pattern from a base station,
   wherein the downlink subframe pattern is defined as a bitmap having a size of 8 bits; and
   a processor configured to
      allocate downlink subframes between a base station and the relay node based on the downlink subframe pattern;
      allocate uplink subframes between the base station and the relay node based on the allocated downlink subframes; and
      assign at least one uplink HARQ process to the allocated uplink subframes,
      wherein a number of the at least one uplink HARQ process is determined by using a decimal equivalent of the bitmap.

4. The relay node according to claim 3, wherein the processor allocates the downlink subframes between the base station and the relay node based on the downlink subframe pattern except for subframes having indexes 0, 4, 5 and 9.

5. The method according to claim 1, wherein a relation between the decimal equivalent of the bitmap and the number of the at least one uplink HARQ process is defined as a Table below

TABLE

| Decimal equivalent of bitmap | Number of at least one uplink HARQ processes |
|---|---|
| 1, 2, 4, 8, 16, 32, 64, 128 | 1 |
| 3, 5, 6, 9, 10, 12, 17, 18, 20, 24, 33, 34, 36, 40, 48, 65, 66, 68, 72, 80, 96, 129, 130, 132, 136, 144, 160, 192 | 2 |
| 7, 11, 13, 14, 19, 21, 22, 25, 26, 28, 35, 37, 38, 41, 42, 44, 49, 50, 52, 56, 67, 69, 70, 73, 74, 76, 81, 82, 84, 85, 88, 97, 98, 100, 104, 112, 131, 133, 134, 137, 138, 140, 145, 146, 148, 152, 161, 162, 164, 168, 170, 176, 193, 194, 196, 200, 208, 224 | 3 |
| 15, 23, 27, 29, 30, 39, 43, 45, 46, 51, 53, 54, 57, 58, 60, 71, 75, 77, 78, 83, 86, 87, 89, 90, 91, 92, 93, 99, 101, 102, 105, 106, 107, 108, 109, 113, 114, 116, 117, 120, 135, 139, 141, 142, 147, 149, 150, 153, 154, 156, 163, 165, 166, 169, 171, 172, 173, 174, 177, 178, 180, 181, 182, 184, 186, 195, 197, 198, 201, 202, 204, 209, 210, 212, 213, 214, 216, 218, 225, 226, 228, 232, 234, 240 | 4 |
| 31, 47, 55, 59, 61, 62, 79, 94, 95, 103, 110, 111, 115, 118, 119, 121, 122, 123, 124, 125, 143, 151, 155, 157, 158, 167, 175, 179, 183, 185, 187, 188, 189, 190, 199, 203, 205, 206, 211, 215, 217, 219, 220, 221, 222, 227, 229, 230, 233, 235, 236, 237, 238, 241, 242, 244, 245, 246, 248, 250 | 5 |
| 63, 126, 127, 159, 191, 207, 223, 231, 239, 243, 247, 249, 251, 252, 253, 254, 255. | 6 |

6. The relay node according to claim 3, wherein a relation between the decimal equivalent of the bitmap and the number of the at least one uplink HARQ process is defined as a Table below

TABLE

| Decimal equivalent of bitmap | Number of at least one uplink HARQ processes |
|---|---|
| 1, 2, 4, 8, 16, 32, 64, 128 | 1 |
| 3, 5, 6, 9, 10, 12, 17, 18, 20, 24, 33, 34, 36, 40, 48, 65, 66, 68, 72, 80, 96, 129, 130, 132, 136, 144, 160, 192 | 2 |
| 7, 11, 13, 14, 19, 21, 22, 25, 26, 28, 35, 37, 38, 41, 42, 44, 49, 50, 52, 56, 67, 69, 70, 73, 74, 76, 81, 82, 84, 85, 88, 97, 98, 100, 104, 112, 131, 133, 134, 137, 138, 140, 145, 146, 148, 152, 161, 162, 164, 168, 170, 176, 193, 194, 196, 200, 208, 224 | 3 |
| 15, 23, 27, 29, 30, 39, 43, 45, 46, 51, 53, 54, 57, 58, 60, 71, 75, 77, 78, 83, 86, 87, 89, 90, 91, 92, 93, 99, 101, 102, 105, 106, 107, 108, 109, 113, 114, 116, 117, 120, 135, 139, 141, 142, 147, 149, 150, 153, 154, 156, 163, 165, 166, 169, 171, 172, 173, 174, 177, 178, 180, 181, 182, 184, 186, 195, 197, 198, 201, 202, 204, 209, 210, 212, 213, 214, 216, 218, 225, 226, 228, 232, 234, 240 | 4 |
| 31, 47, 55, 59, 61, 62, 79, 94, 95, 103, 110, 111, 115, 118, 119, 121, 122, 123, 124, 125, 143, 151, 155, 157, 158, 167, 175, 179, 183, 185, 187, 188, 189, 190, 199, 203, 205, 206, 211, 215, 217, 219, 220, 221, 222, 227, 229, 230, 233, 235, 236, 237, 238, 241, 242, 244, 245, 246, 248, 250 | 5 |
| 63, 126, 127, 159, 191, 207, 223, 231, 239, 243, 247, 249, 251, 252, 253, 254, 255. | 6 |

* * * * *